United States Patent [19]
Ogino et al.

[11] Patent Number: 5,537,171
[45] Date of Patent: *Jul. 16, 1996

[54] LIQUID CRYSTAL PROJECTION DISPLAY

[75] Inventors: Masanori Ogino, Yokohama; Yoshiaki Iwahara, Yokosuka; Takeo Yamada, Yokohama; Shigeru Mori, Chigasaki; Fumio Inoue; Akio Yamamoto, both of Yokohama, all of Japan

[73] Assignee: Hitachi, Ltd., Tokyo, Japan

[ * ] Notice: The term of this patent shall not extend beyond the expiration date of Pat. No. 5,355,187.

[21] Appl. No.: 320,313

[22] Filed: Oct. 11, 1994

Related U.S. Application Data

[63] Continuation-in-part of Ser. No. 29,640, Mar. 11, 1993, Pat. No. 5,355,187.

[30] Foreign Application Priority Data

Mar. 13, 1992 [JP] Japan .................. 4-054749

[51] Int. Cl.⁶ .................................................. G03B 21/00
[52] U.S. Cl. ...................... 353/122; 353/38; 353/102; 359/40
[58] Field of Search .......................... 353/122, 38, 102; 359/40, 41, 48, 49

[56] References Cited

U.S. PATENT DOCUMENTS

| | | | |
|---|---|---|---|
| 4,770,525 | 9/1988 | Umeda et al. | 353/38 |
| 4,902,115 | 2/1990 | Takahashi | 359/40 |
| 4,941,732 | 7/1990 | Umeda et al. | 353/78 |
| 5,264,880 | 11/1993 | Sprague et al. | 353/31 |
| 5,355,187 | 10/1994 | Ogino et al. | 353/38 |
| 5,418,586 | 5/1995 | Fujimori et al. | 353/34 |

*Primary Examiner*—William C. Dowling
*Attorney, Agent, or Firm*—Antonelli, Terry, Stout & Kraus

[57] ABSTRACT

A liquid crystal projection display capable of functioning at a high light capturing efficiency and a high relative corner illuminance comprises a light source means including a light source, a liquid crystal panel means, a projection lens means and a screen means. A liquid lens formed by sealing a liquid in a space between opposite transparent members is disposed near the light source or the real image of the light source to enhance the relative corner illuminance without reducing the light capturing efficiency by multiplying the angle of divergence of light rays emitted by the light source by the reciprocal of the refractive index of the liquid. A first optical system disposed on the entrance side of the liquid crystal panel is provided with a relative corner illuminance enhancing means comprising a first light converging means disposed relatively near to the light source means, and a second light converging means disposed relatively remote from the light source means. The first light converging means enhances the relative corner illuminance on the entrance surface of the second light converging means.

20 Claims, 19 Drawing Sheets

40% H × 80%V = 32% AREA $RCI = \cos^4 \alpha$ $E(\alpha) = \sin^2 \alpha$ $$RCI = \cos^4\left\{\sin^{-1}\frac{(\sin\alpha)}{n}\right\}$$

$$a_0 = \sin^{-1} \frac{\sin a_P}{n}$$

Ex. $\begin{cases} a_P = 42° \\ n = 1.5 \end{cases}$ $a_0 = 26.5°$ $\therefore RCI = \cos^4 a_0 = 0.64$ FIG. 22a
FIG. 22b
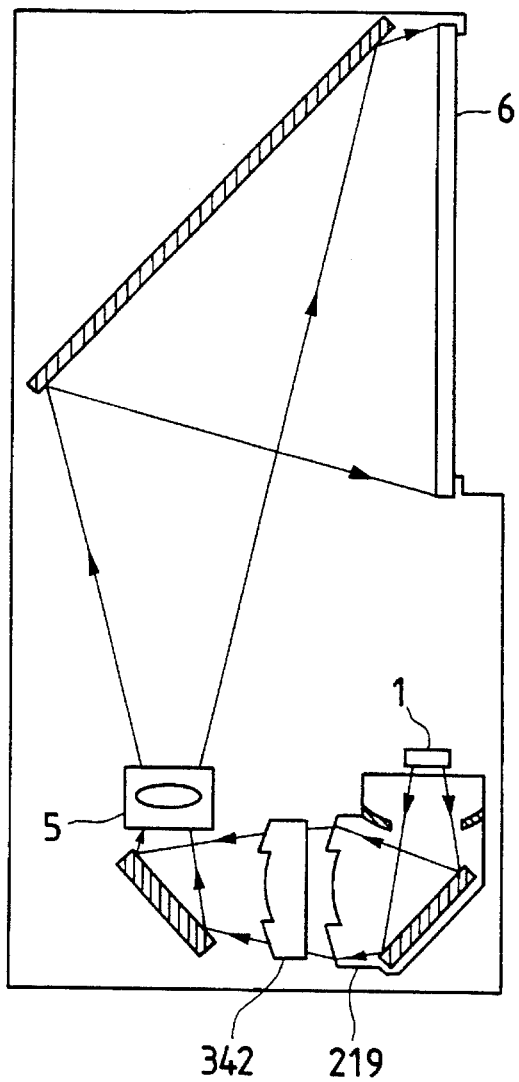
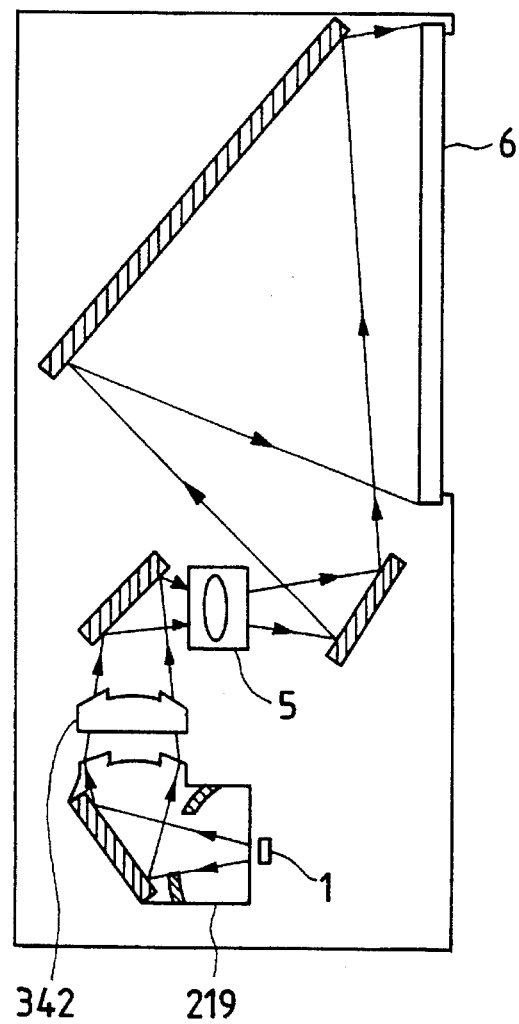

LIQUID CRYSTAL PROJECTION DISPLAY

CROSS-REFERENCE TO RELATED APPLICATIONS

This application is a continuation-in-part of prior parent application Ser. No. 08/029,640, filed Mar. 11, 1993, now U.S. Pat. No. 5,355,187.

BACKGROUND OF THE INVENTION

1. Field of the Invention

The present invention relates to a liquid crystal projection display having excellent relative corner illuminance characteristics.

2. Background Art

Referring to FIG. 1a showing a prior an liquid crystal projection display of a one-panel one-lens type, there are shown a surface light source 1, a Fresnel collimator lens 2, a liquid crystal panel 3 of about 250 mm in diagonal length, 200 mm in width, 150 mm in height and about 2 mm in thickness, a converging Fresnel lens 4, a projection lens 5 and a screen 6. In FIG. 1a, $\beta$ and $\beta'$ are angles of view and $\omega$ (rad) is the angle of divergence of light rays passing through the liquid crystal panel 3. An image formed on the liquid crystal panel 3 is focused on the screen 6 by the projection lens 5. As is generally known, the light modulating characteristics of the generally known TN (twisted nematic) liquid crystal panel are dependent on the inclination of the transmitted light rays. The mode of dependence of the light modulating characteristics on the incidence angle is anisotropic; light rays diverge in a narrower directivity angle in the direction of the plane of polarization and diverge in a wider directivity angle in a direction perpendicular to the plane of polarization. In an ordinary TN liquid crystal panel, the direction of the narrower directivity angle corresponds to a vertical direction, and the direction of the wider angle corresponds to a horizontal direction. Accordingly, an optical system capable of reducing the angle of divergence in the direction of the narrower directivity angle of the liquid crystal panel must be used to enable the liquid crystal panel to function in satisfactory light modulating characteristics, i.e., to form an image of a high contrast. It is empirically known that the contrast C is approximately equal to $6/\omega^2$. When reproducing a natural picture, the contrast C must be 100 or above to reproduce the natural picture in high contrast. Accordingly, the angle $\omega$ of divergence must be about 0.25 rad or below.

The liquid crystal panel 3 has a surface provided with 640×480 pixels of about 0.3 mm square in area. FIG. 1b shows the shape of a pixel for a monochromatic liquid crystal panel, in which a shaded portion is the blackened area that does not transmit light rays. FIG. 1c shows the shape of one pixel trio for reproducing color images, in which a shaded portion is a blackened area, and R, G and B indicate red, green and blue pixels. The ratio of the effective area to the total area of the pixel of FIG. 1b is about 64%, and that of the pixel trio of FIG. 1c is about 32%. The relative corner illuminance (RCI) of the prior art is shown in FIG. 2a, in which the converging angle $\alpha$ of the light rays emitted by the surface light source 1 of FIG. 1a is measured to the right on the horizontal axis, and the relative corner illuminance on the plane of incidence of the Fresnel collimator lens 2 is measured upward on the vertical axis. The distribution of relative corner illuminance on the Fresnel collimator lens 2 is substantially the same as that on the liquid crystal panel 3. As is generally known, the distribution of relative corner illuminance conforms to the $\cos^4$ law. FIG. 2b is a graph showing the variation of the light capturing efficiency $E(\alpha)$ of the Fresnel collimator lens 2 with the angle $\alpha$ of convergence. As is generally known, the variation of the light capturing efficiency $E(\alpha)$ conforms to the $\sin^2$ law. As is obvious from FIGS. 2a and 2b, whereas $E(\alpha)=100\%$ when RCI=0% and when $\alpha=\pi/2$, $E(\alpha)=50\%$ when RCI=25% and when $\alpha=\pi/4$. The relative corner illuminance needs to be about 50% to form an image in a satisfactory quality. Accordingly, as is obvious from FIG. 2a, the converging angle $\alpha$ must be about 0.57 rad or below and, consequently, the light capturing efficiency $E(\alpha)$ is reduced inevitably to 29% as shown in FIG. 2b. Thus, it is difficult for the prior art to improve the relative corner illuminance without reducing the light capturing efficiency $E(\alpha)$.

As mentioned above, the light capturing efficiency conforms to the $\sin^2$ law and the relative corner illuminance conforms to the $\cos^4$ law when a single fiat collimator lens and a single small surface light source disposed at the focal point of the fiat collimator lens are used in combination. Therefore, there is a reciprocal relation between the light capturing efficiency and the relative corner illuminance that the sum of the square root of the relative corner illuminance and the light capturing efficiency is always 1 or not greater than 1.

It is possible to prove that the reciprocal relation applies also to the combination of a single paraboloidal collimator mirror and a single point light source disposed at the focal point of the paraboloidal collimator mirror. The ratio of collimated light, namely, the light capturing efficiency is equal to $\sin^2 0.56\alpha$ and the relative corner illuminance is equal to $\cos^4 0.56\alpha$, where $\alpha$ is a convergence angle. Accordingly, the sum of the square root of the relative corner illuminance and the light capturing efficiency is equal to 1.

FIG. 3a shows a portion of the converging Fresnel lens 4 of FIG. 1a. In FIG. 3a, the incident light rays 9 are represented by a continuous line, the normal outgoing light rays 10 are represented by continuous line and ghost light rays 12, namely, undesired interference light rays, are represented by broken lines. Some of the incident light rays 9 reflected by the plane 4' of exit of the converging Fresnel lens 4, namely, ghost light rays, are reflected by the plane 11 of incidence of the converging Fresnel lens 4 in total reflection. The ghost light rays 12 form a ghost image on the screen.

A means for reducing ghost interference disposes the converging Fresnel lens 4 in a reverse position as shown in FIG. 3b. However, when the converging Fresnel lens 4 is disposed in a reverse position, some of the incident light rays 9 falling on shaded portions 9" do not travel in the correct direction of outgoing light rays 10, which reduces the relative corner illuminance. Thus, it is difficult for the prior art to increase the relative corner illuminance without entailing ghost interference.

Although the ghost interference caused by the ghost light rays produced by the converging Fresnel lens 4 disposed behind the liquid crystal panel 3 as shown in FIG. 1a is conspicuous, the ghost light rays produced by the Fresnel collimator lens 2 disposed before the liquid crystal panel 3 do not cause problems because the ghost light rays travel outside the field of view of the projection lens 5.

As is apparent from the foregoing description, it is difficult for the prior art to prevent the reduction of light capturing efficiency or undesirable ghost interference and, at the same time, to enhance relative corner illuminance.

SUMMARY OF THE INVENTION

Accordingly, it is an object of the present invention to provide a liquid crystal projection display capable of enhancing relative corner illuminance without reducing light capturing efficiency.

Another object of the present invention is to provide a liquid crystal projection display capable of eliminating adverse effects of the reduction of light capturing efficiency of a projection optical system capable of projecting light rays so that relative corner illuminance is improved and ghost interference is reduced, and of displaying an image of a satisfactory quality.

A third object of the present invention is to provide a means for reducing the adverse effect of moire produced by the interference between the arrangement of pixels of a liquid crystal panel included in an optical system capable of projecting light rays so that relative corner illuminance is improved, and a lenticular lens provided on a screen.

A fourth object of the present invention is to provide a means for reducing differences in brightness and in whiteness between the displays of a multiscreen display employing an optical system capable of projecting light rays so that relative corner illuminance is improved.

BRIEF DESCRIPTION OF THE DRAWINGS

The above and other objects, features and advantages of the present invention will become more apparent from the following description taken in connection with the accompanying drawings, in which:

FIGS. 1b and 1c are plan views of pixels of the prior art liquid crystal projection display of FIG. 1a;

FIGS. 22a and 22b are schematic sectional views, respectively, of a liquid crystal projection display in a sixteenth embodiment according to the present invention;

FIG. 29 is a sectional diagram to help an understanding of the principle of this invention;

FIG. 30 is a diagrammatic view of a variation of the first embodiment;

FIG. 31 and FIG. 32 are other sectional diagrams to help an understanding of the principle of this invention;

FIG. 33 is a diagrammatic view of another variation of the first embodiment;

FIG. 34 is a diagrammatic view of still another variation of the first embodiment; and FIG. 35 is a plane view of a mirror means.

DESCRIPTION OF THE PREFERRED EMBODIMENTS

To achieve the objects of the invention, the present invention employs the following means.

An optical system according to the present invention on the entrance side of a liquid crystal panel is provided with a relative illuminance enhancing means for enhancing illuminance in the corners of the screen of the liquid crystal panel (first to eighth embodiments).

An optical system according to the present invention disposed on the exit side of a liquid crystal panel is provided with a ghost interference reducing means (ninth, tenth and thirteenth embodiments).

An optical system according to the present invention disposed on the exit side of a liquid crystal panel is provided with a lenticular lens means for reducing moire interference (fourteenth and fifteenth embodiments).

A liquid crystal projection display is provided with a vertical directivity controlling lenticular lens means (nineteenth embodiment).

An optical system according to the present invention disposed on the exit side of a liquid crystal panel is provided with a transmissivity detecting and controlling means for detecting and controlling the transmissivity of the liquid crystal panel (twentieth embodiment).

The relative illuminance enhancing means reduces the illuminance in the central region of the screen of the liquid crystal panel and increases the illuminance in the corners of the screen of the liquid crystal panel to improve the relative corner illuminance without reducing light capturing efficiency.

The ghost interference reducing means reduces the reflectivity of the surface with ghost light rays (ninth and tenth embodiments) or makes ghost light rays diverge to reduce the undesirable effect of ghost light rays (thirteenth embodiment).

The lenticular lens means blurs the arrangement of pixels forming an image on a screen (fourteenth embodiment).

The transmissivity detecting and controlling means detects the transmissivity of the liquid crystal panel corresponding to a black level signal and a white level signal, and controls the transmissivity so as not to deviate from a fixed value.

The vertical directivity controlling lenticular lens means compensates chromatic aberration attributable to the Fresnel lens to reduce tone deviation.

Figure 1A:
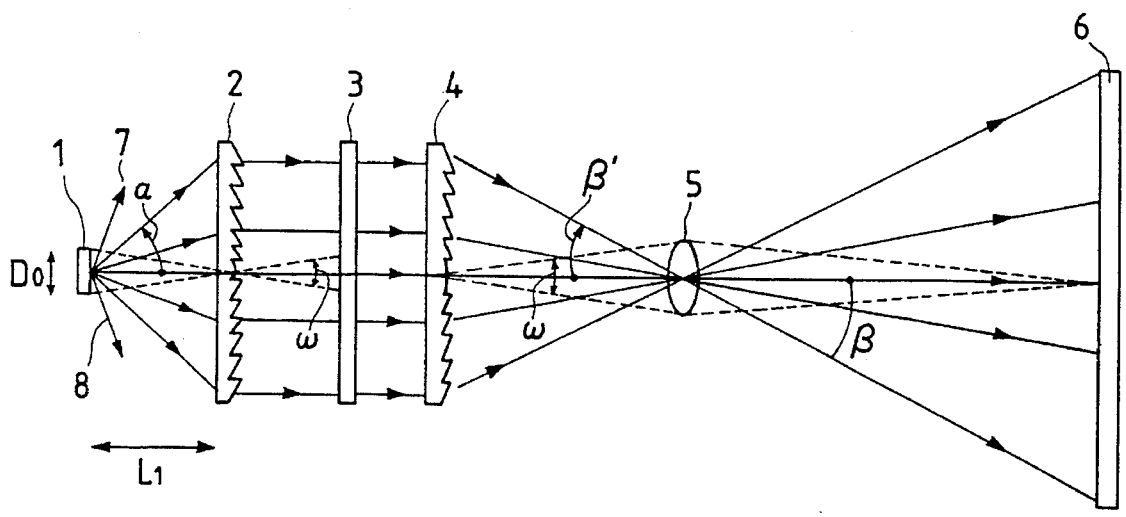
FIG. 1a is a schematic sectional view of a prior art liquid crystal projection display.
Figure 1B:
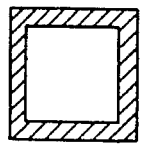
Figure 1C:
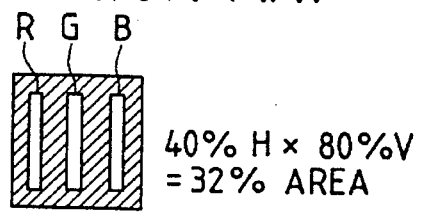
Figure 4:
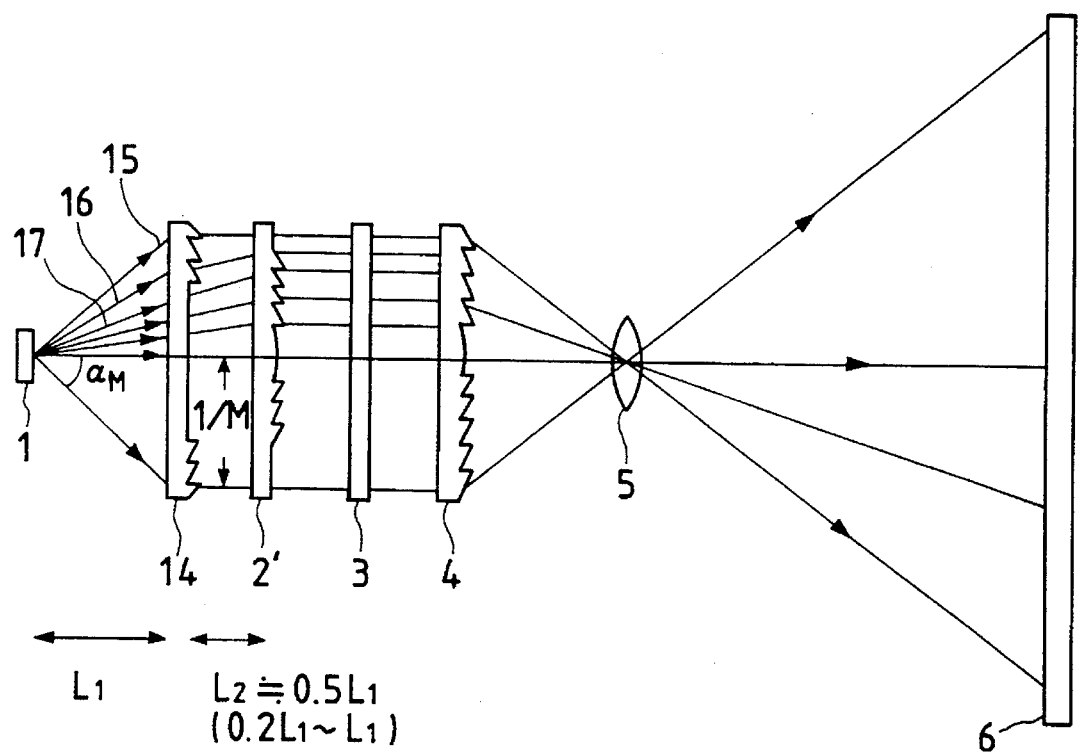
FIG. 4 is a schematic sectional view of a liquid crystal projection display in a first embodiment according to the present invention.

First Embodiment:

A liquid crystal projection display in a first embodiment according to the present invention will be described hereinafter with reference to FIG. 4, in which parts like or corresponding to those shown in FIG. 1a are designated by the same reference numerals and the description thereof is omitted. Referring to FIG. 4, the liquid crystal projection display is provided with a relative illuminance enhancing means included in an optical system on the entrance side of the liquid crystal panel 3 and comprising Fresnel lenses 14 and 2' arranged in that order with respect to the direction of travel of light rays between the surface light source 1 and the liquid crystal panel 3. Outer light rays 15, middle light rays 16 and inner light rays 17 fall in the peripheral region, the middle region and the central region, respectively, of the Fresnel lens 14. The peripheral region of the Fresnel lens 14 has a maximum power (a minimum focal length), the middle region of the same has a middle power, and the central region of the same has a minimum power, that is, the Fresnel lens 14 is formed in a profile that makes light rays fall on the entrance surface of the Fresnel lens 2' in a substantially uniform illuminance distribution. The Fresnel lens 2' is formed in a profile that makes the outgoing light rays travel substantially in parallel with the optical axis of the liquid crystal panel 3. Thus, the Fresnel lens 14 nearer to the surface light source 1 than the Fresnel lens 2' is formed so that the peripheral region thereof has the highest light converging ability, and the Fresnel lens 2' nearer to the liquid crystal panel 3 than the Fresnel lens 14 is formed so that the central region thereof has the highest light converging ability. In a modification, the Fresnel lens 14 may be substituted by a toroidal lens of an outside diameter equal to the diameter of the Fresnel lens 14, and the Fresnel lens 2' may be substituted by a circular lens of a diameter equal to the outside diameter of the middle region of the Fresnel lens 2'.

Thus, the Fresnel lenses 14 and 2' make light rays fall on the entrance surface of the liquid crystal panel 3 in a uniform illuminance distribution, because the illuminance in the central region of the liquid crystal panel 3 is lower than that in the central region of the liquid crystal panel of the prior art liquid crystal projection display, and the illuminance in the peripheral region of the liquid crystal panel 3 is higher than that in the peripheral region of the liquid crystal panel of the prior art liquid crystal projection display. Thus, the relative corner illuminance, namely, the ratio of the illuminance in the peripheral region of the liquid crystal panel to that in the central region of the same, can be improved without reducing light capturing efficiency.

A method of designing the Fresnel lenses 14 and 2' for making illuminance distribution on the entrance surface of the liquid crystal panel 3 uniform will be explained with reference to FIG. 5.

The prism angle $\Theta$ of a Fresnel lens is calculated by using formulas (1) and (2).

$$\tan\theta = \frac{\sin\alpha - \sin\gamma}{n \cdot \sin\left(\cos^{-1}\frac{\sin\alpha}{n}\right) - \cos\gamma} \quad (1)$$

$$\tan\gamma = \frac{y_M \cdot \sin\alpha - y}{L_2 \cdot \sin\alpha_M} \quad (2)$$

where $\alpha$ is an incidence angle, y is an outgoing angle, and $\gamma$ is the refractive index of the material forming the Fresnel lens.

Figure 5:
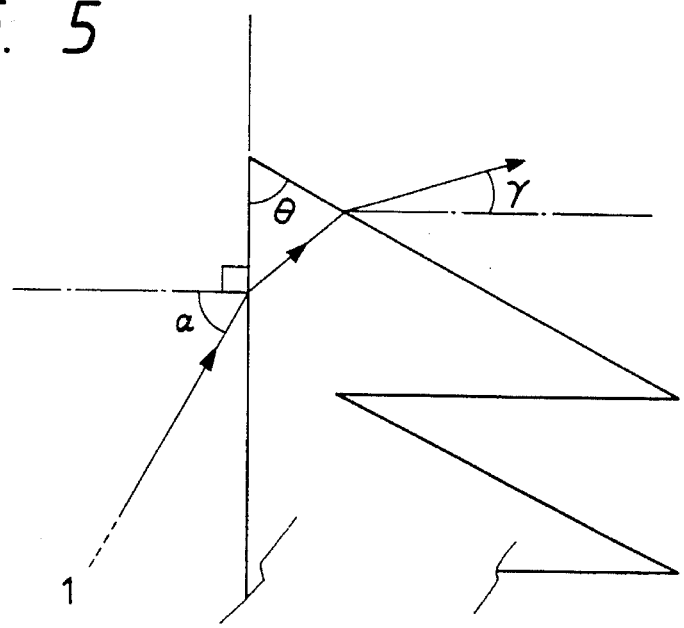
FIG. 5 is a diagrammatic view of assistance in explaining the principle on which the first embodiment is based.

As shown in FIG. 5, with the Fresnel lens 14 of the first embodiment shown in FIG. 4, the incidence angle $\alpha$ is equal to the inclination $\alpha$ of the light rays emitted by the light source. The outgoing angle $\gamma$ can be calculated by using the formula (2). In the formula (2), $L_2$ is the distance between the lenses 14 and 2', $\alpha_M$ is a maximum incidence angle on the Fresnel lens 14', $y_M$ is the radius of the Fresnel lens 2', and y is the vertical distance between the center of the Fresnel lens 14 and a point of incidence of light rays on the Fresnel lens 14.

Referring to FIG. 5, with the Fresnel lens 2', the outgoing angle $\gamma$ is approximately equal to 0°, and the incidence angle is equal to the outgoing angle $\gamma$ of light rays leaving the Fresnel lens 14. The prism angle $\Theta$ of the Fresnel lens 2' also can be calculated by using the formulas (1) and (2). The Fresnel lenses 14 and 2' thus designed make the illuminance distribution on the liquid crystal panel 3 uniform.

It is noted that the Fresnel lenses 14 and 2' need not necessarily be designed by using the formulas (1) and (2). The Fresnel lens 2' of the optical system on the entrance side of the liquid panel, disposed nearer to the liquid crystal panel 3 and having a central region having a power higher than that of the peripheral region of the same, and the Fresnel lens 14 of the same optical system, disposed nearer to the light source 1 and having a peripheral region having a power higher than that of the central region of the same are the constituent features of the first embodiment of the present invention.

Figure 6A:
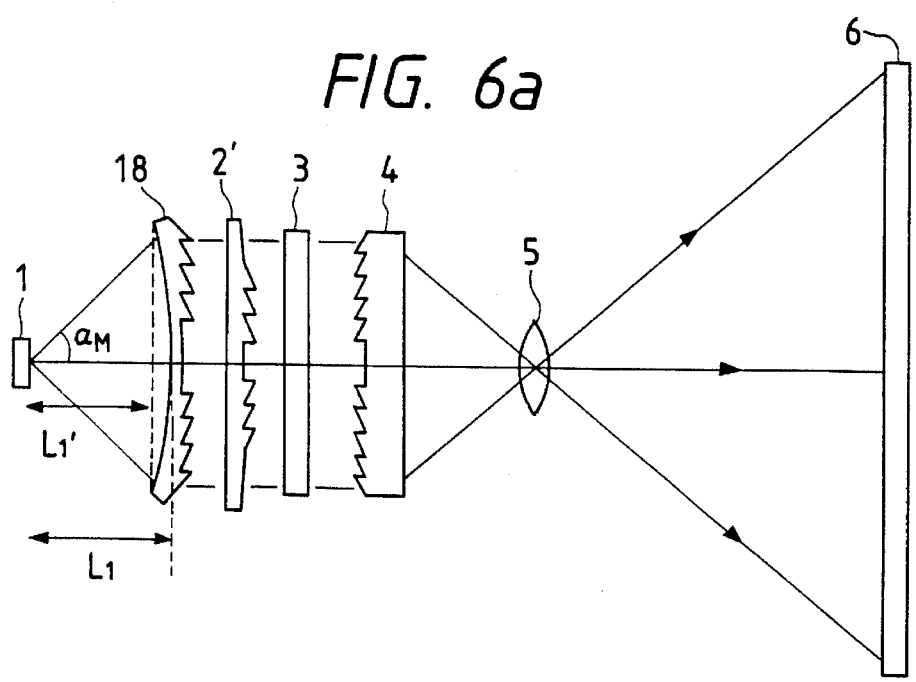
FIGS. 6a and 6b are a schematic sectional view of a liquid crystal projection display in a second embodiment according to the present invention and a plan view of assistance in explaining a method of forming a Fresnel lens having a spherical surface, respectively.

Second Embodiment:

A liquid crystal projection display in a second embodiment according to the present invention will be described with reference to FIGS. 6a and 6b, in which parts like or corresponding to those of the first embodiment are designated by the same reference numerals and the description thereof will be omitted.

The second embodiment employs a converging Fresnel lens 18 having a spherical or cylindrical entrance surface convex toward the light source 1 instead of the Fresnel lens 2 of the prior art liquid crystal projection display shown in FIG. 1a, having a flat entrance surface.

In the prior art liquid crystal projection display, the light capturing efficiency was about 50% and the relative corner illuminance was 25% when the maximum incidence angle $\alpha_M$ on the entrance surface of the converging Fresnel lens 2 was $\pi/4$ rad.

In the second embodiment, the relative corner illuminance can be increased beyond 25% when $\alpha_M = \pi/4$ rad without reducing the light capturing efficiency below about 50%. For example, when $L_1/L_1' = 1.1$ in the arrangement of FIG. 6a, the illuminance in the central region of the liquid crystal panel 3 is about 1/1.21 times the illuminance in the same region when the converging Fresnel lens 2 of FIG. 1a is used, and the illuminance in the peripheral region of the liquid crystal panel 3 is about 1.2 times the illuminance in the same region when the converging Fresnel lens 2 of FIG. 1a is used. Accordingly, the relative corner illuminance of the liquid crystal panel 3 is about 1.4 times (1.2×1.2) the relative corner illuminance of the same when the converging Fresnel lens 2 of FIG. 1a is used.

Figure 6B:
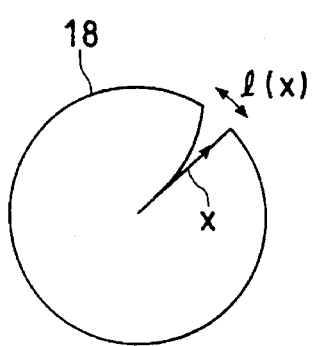

FIG. 6b shows a method of forming the Fresnel lens 18 having a concave entrance surface from a Fresnel lens having a flat entrance surface. In FIG. 6b, x is the distance between a point on a radius and the center, l(x) is the width of a sectorial region to be cut off at the point at the distance x from the center, and R is the radius of curvature of the concave surface of the Fresnel lens 18. After cutting off the sectorial region, the edges of the cut are joined together adhesively to obtain the Fresnel lens 18 having a concave entrance surface.

$$l(x) = 2\pi x^3 / 6R^2 \tag{3}$$

When x=100 mm, R=300 mm,
l(x)=23 mm.

The factor $x^3/6R^2$ is approximated through the Taylor expansion of $x/R - \sin(x/R)$.

The constituent feature of the second embodiment is the optical system on the entrance side of the liquid crystal, provided with the converging Fresnel lens having a concave entrance surface concave toward the light source.

Third Embodiment:

A liquid crystal projection display in a third embodiment according to the present invention will be described hereinafter with reference to FIG. 7a, in which parts like or corresponding to those shown in FIG. 4 are designated by the same reference numerals and the description thereof will be omitted.

Figure 7A:
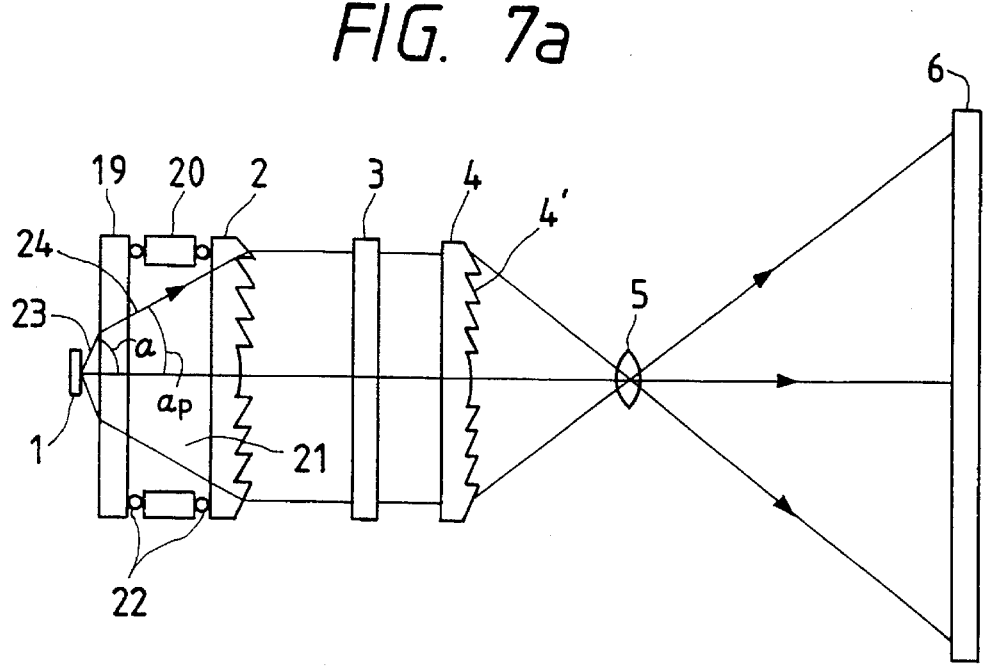
FIGS. 7a, 7b and 7c are a schematic sectional view of a liquid crystal projection display in a third embodiment according to the present invention, and graphs of assistance in explaining the principle on which the third embodiment is based.

Shown in FIG. 7a are a transparent plate 19, a vessel 20 having the shape of a circular cylinder or a square cylinder, a Fresnel lens 2, a transparent liquid 21 contained in the vessel 20, and O rings 22 for sealing the vessel 20. The transparent liquid 21 is a liquid having a refractive index nearly equal to those of the transparent plate 19 and the Fresnel lens 2 and having a comparatively low vapor pressure, such as silicone oil, ethylene glycol or glycerol.

Figure 7B:
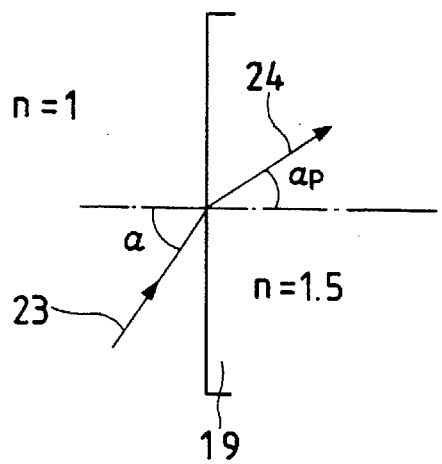

The principle on which the third embodiment functions will be described with reference to FIGS. 7b and 7c. Referring to FIG. 7b, the relation between the incidence angle $\alpha$ at which the light rays traveling through air arrive at the transparent plate 19, and the angle $\alpha_p$ of refraction is expressed by the following expression.

$$\sin\alpha = n \cdot \sin\alpha_p \tag{4}$$

Since $\alpha \leq 90°$, when n=1.5, $$\alpha_p \leq \sin^{-1}(1/1.5) = 42° \tag{5}$$

Figure 2A:
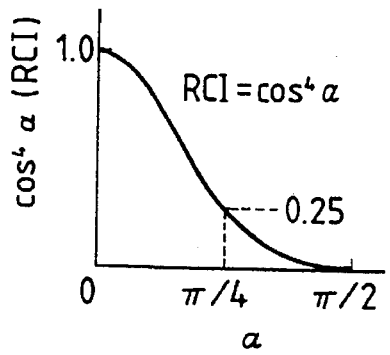
FIGS. 2a and 2b are graphs of assistance in explaining problems in the prior art.
Figure 7C:
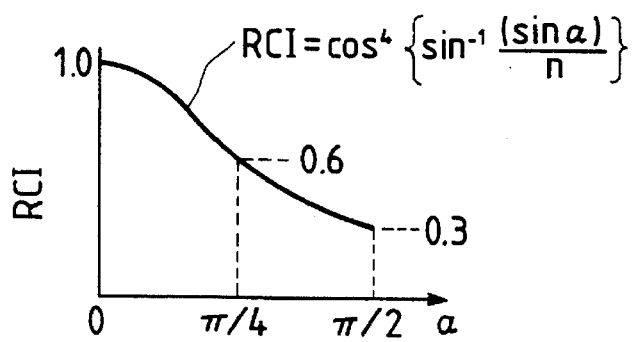

As is obvious from the comparison of FIGS. 7c and 2a, the relative corner illuminance of the third embodiment is far greater than that of the prior art.

For example, when the incidence angle $\alpha = \pi/4$ rad (45°), RCI=0.6 for the third embodiment whereas RCI=0.25 for the prior art. Thus, the transparent liquid 21 sealed in the vessel 20 improves the relative corner illuminance remarkably.

The constituent feature of the third embodiment is the transparent liquid 21 for the enhancement of illuminance in the peripheral region of the liquid crystal panel 3.

The cooling effect of the convection of the transparent liquid 21 is the secondary effect of the transparent liquid 21. The cooling effect of the transparent liquid enables the use of a more intense light source than that of the prior art liquid crystal projection display, so that the liquid crystal projection display in the third embodiment displays images brighter than those displayed on the prior art liquid crystal projection display.

The prism angle of the Fresnel lens 2 may be determined through calculation using the formulas (1) and (2).

Figure 8A:
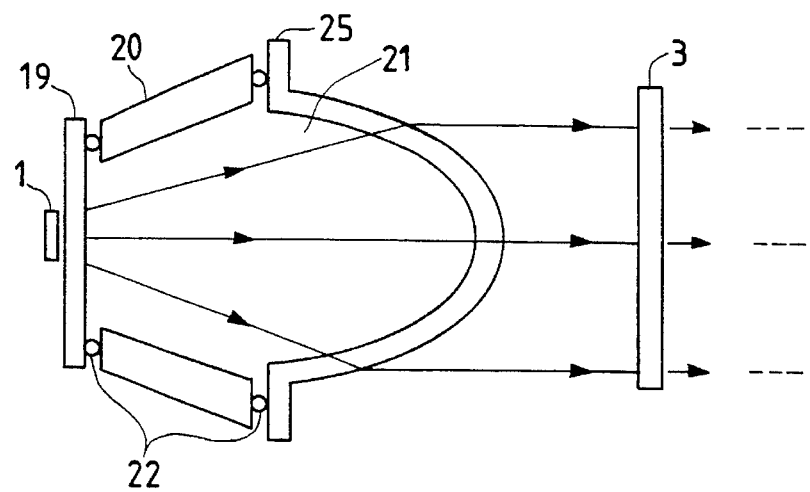
FIGS. 8a and 8b are schematic sectional views of a liquid crystal projection display in a fourth embodiment according to the present invention.

Fourth Embodiment:

Referring to FIG. 8a, the fourth embodiment employs, instead of the Fresnel lens 2 of the third embodiment, an ellipsoidal lens 25 having an eccentricity approximately equal to the reciprocal of the refractive index of a transparent liquid 21 sealed in a space defined by a transparent plate 19, a vessel 20 and the lens 25. A light source 1 is disposed at the remote focus of the ellipsoidal surface of the ellipsoidal lens 25 so that the ellipsoidal lens 25 is able to collimate the incident light rays.

The relative corner illuminance on the liquid crystal panel 3 of the fourth embodiment is higher than that shown in FIG. 7c on the liquid crystal panel 3 of the third embodiment.

Figure 8B:
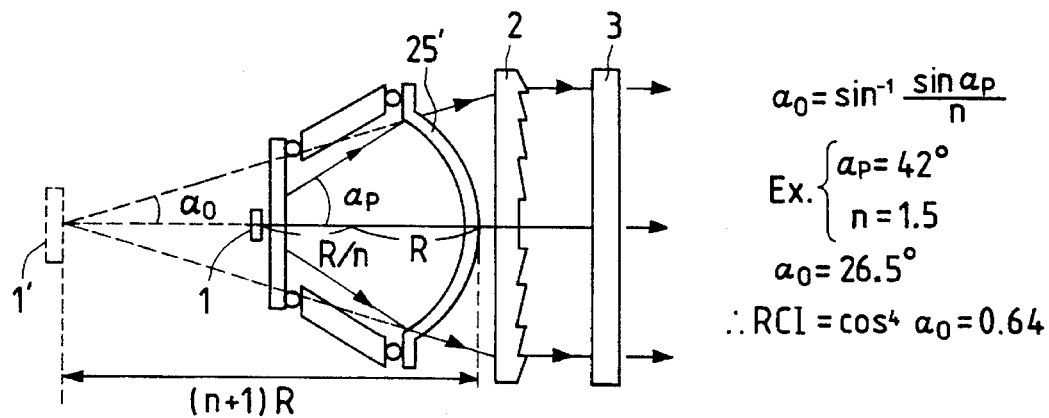

FIG. 8b shows a modification of the fourth embodiment. This modification employs a spherical lens 25' and a Fresnel lens 2 instead of the ellipsoidal lens 25. In this modification, RCI≈0.64. This modification uses the principle of aplanatic point of optics. For further details of the principle of aplanatic point, refer to U.S. Pat. No. 4,576,442 which corresponds to Japanese Patent Laid-open No. 59-142513

(Japanese Patent Application No. 58-16156 filed by the applicant of the present patent application).

Figure 9:
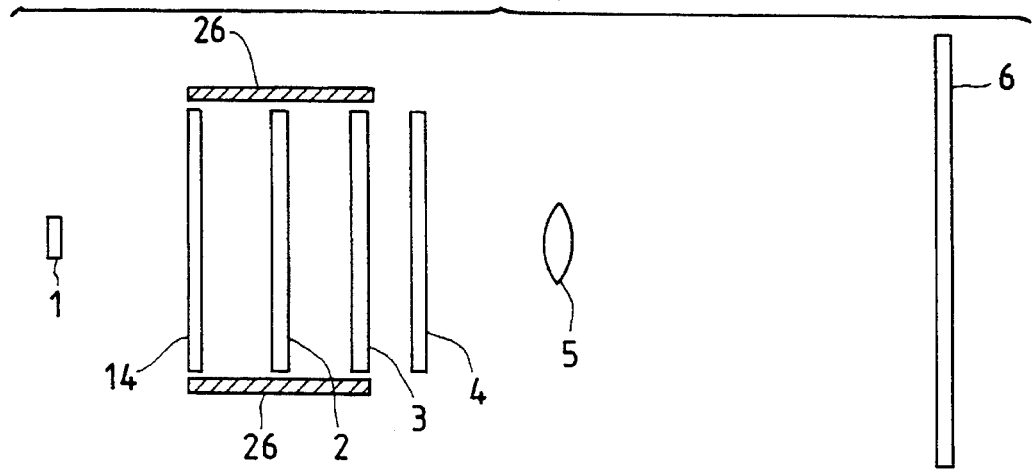
FIG. 9 is a sectional view of a liquid crystal projection display in a fifth embodiment according to the present invention.

Fifth Embodiment:

A liquid crystal projection display in a fifth embodiment according to the present invention is shown in FIG. 9, in which parts like or corresponding to those of the first embodiment shown in FIG. 4 are designated by the same reference numerals and the description thereof will be omitted. The fifth embodiment comprises, in addition to the components of the first embodiment shown in FIG. 4, mirrors 26 for preventing the unnecessary scattering of light rays. The second, third and fourth embodiments may be provided with the mirrors 26.

FIGS. 12a, 12b, 13 and 14 show different light sources.

Figure 10A:
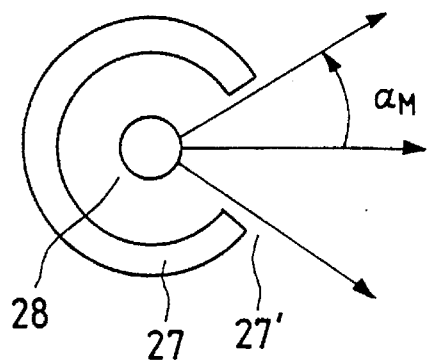
FIGS. 10a and 10b are views of assistance in explaining a sixth embodiment of the present invention.

Sixth Embodiment:

A liquid crystal projection display in a sixth embodiment according to the present invention will be described with reference to FIGS. 10a and 10b. A cylindrical light source 28 is disposed with its longer side extending along a horizontal direction, i.e., the direction of the wider angle of directivity of the liquid crystal panel, and its shorter side extending along a vertical direction, i.e., the direction of the narrower angle. The light source may be a metal halide lamp, halogen lamp or a xenon lamp. A cylindrical or elliptic mirror 27 is disposed with its longer side extended along a horizontal direction, i.e., the direction of the wider angle of directivity of the liquid crystal panel, and its shorter side extended along a vertical direction, i.e., the direction of the narrower angle.

Figure 10B:
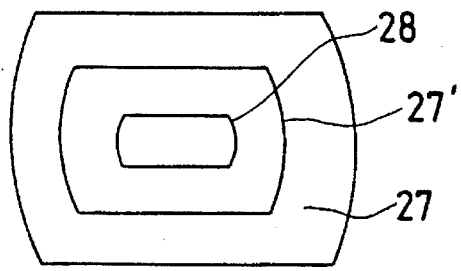

As shown in FIG. 10b, the mirror 27 has an opening 27' having a longer side extended along a horizontal direction and a shorter side extended along a vertical direction. Thus, unnecessary diffusion of light rays through the opening 27' can be prevented. The maximum angle $\alpha_M$ of the direction of travel of light rays traveling through the opening 27' to the optical axis of the liquid crystal panel is limited to, for example, about 30° or below to enhance the relative corner illuminance. Since the angle ω, which has been described with reference to FIG. 1a, of divergence of light rays transmitted through the liquid crystal panel with respect to the direction of the narrower angle is narrower than that with respect to the direction of the wider angle of the liquid crystal panel, the loss of light can be suppressed to the least extent to prevent the reduction of contrast.

The constituent features of the sixth embodiment is disposing the light source with its longer side extended along the direction of the wider angle of directivity of the liquid crystal panel and its shorter side extended along the direction of the narrower angle.

Figure 11A:
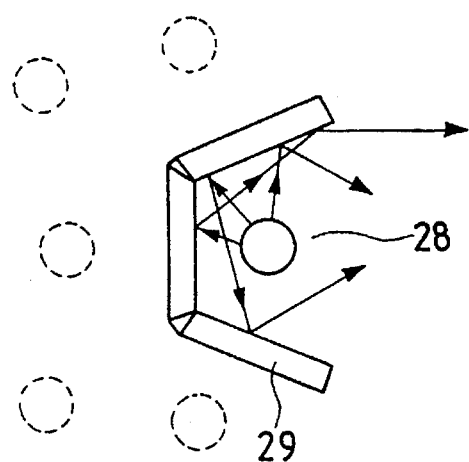
FIGS. 11a, 11b, 11c and 11d are views of assistance in explaining a seventh embodiment of the present invention.
Figure 11B:
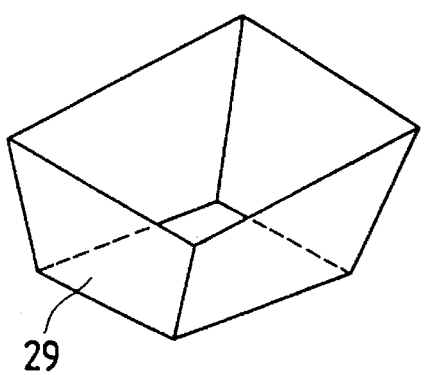

Seventh Embodiment:

A liquid crystal projection display in a seventh embodiment according to the present invention and modifications thereof are shown in FIGS. 11a to 11d. Shown in FIG. 11a is a polyhedral mirror 29 and a light source 28, such as a point light source or a cylindrical light source. FIG. 11b is a perspective view of the mirror 29. In FIG. 11a, dotted circles are virtual images of the point light source 28 formed by the mirror 29. Thus the mirror 29 forms a plurality of virtual images of the light source.

Figure 11C:
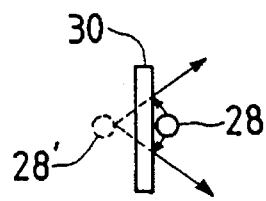

Shown in FIG. 11c are a flat mirror 30 and a light source 28, such as a point light source or a cylindrical light source. The flat mirror 30 forms one virtual light source 28'.

Figure 11D:
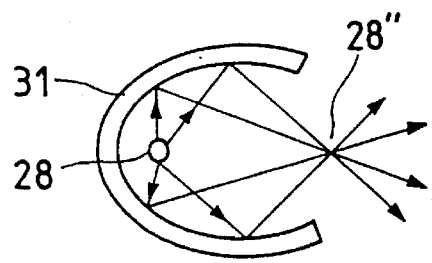

Referring to FIG. 11d, a point light source 28 is disposed at one of the foci of an elliptic mirror 31 to form a real image 28" at the other focus of the elliptic mirror 31. The arrangements shown in FIGS. 11a to 11d may be used instead of the surface light source 1 employed in the first to fifth embodiments.

Figure 12A:
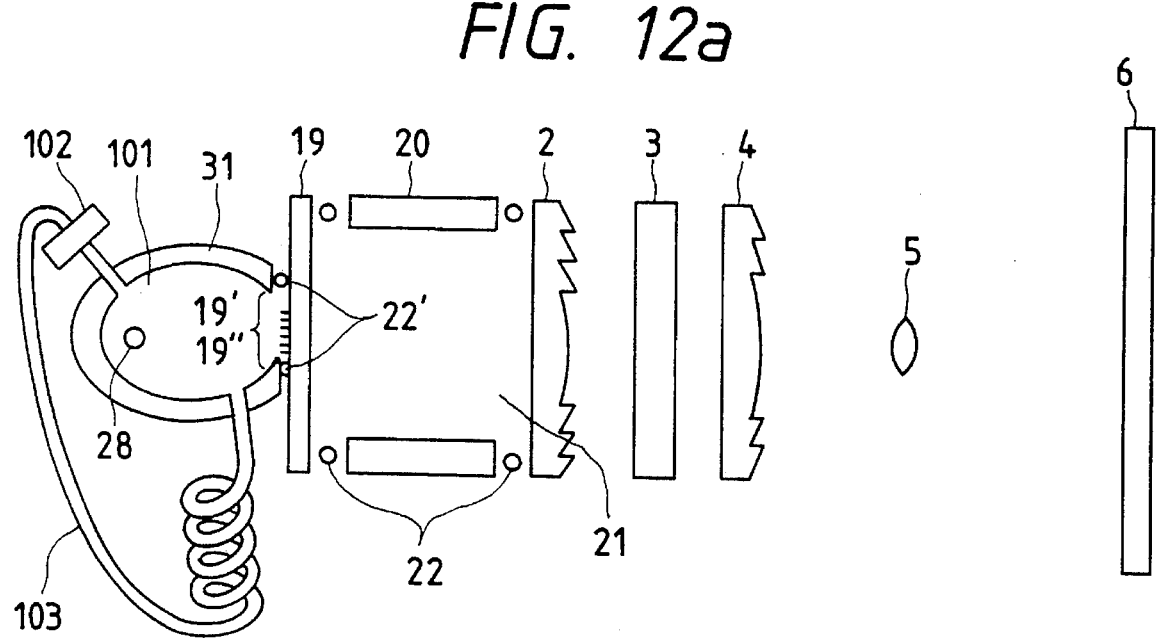
FIGS. 12a and 12b are views of assistance in explaining an eighth embodiment of the present invention.

Eighth Embodiment:

A liquid crystal projection display in an eighth embodiment according to the present invention is shown in FIG. 12a. The eighth embodiment is similar in construction to the third embodiment, except that the eighth embodiment employs the light source unit shown in FIG. 11d instead of the surface light source 1 of FIG. 7a. In FIG. 12a, indicated at 101 is a heat transfer medium, such as air or a liquid, at 22' are sealing members, at 102 is a motor-driven miniature pump and at 103 is a tube. The miniature pump 102 circulates the heat transfer medium 101 through a space defined by the elliptic mirror 31 to cool the light source 28. As shown in FIG. 12a, a diffraction grating 19' is provided on the entrance surface of a transparent plate 19, and a Faraday element 19" turns the plane of polarization of light through an angle of 45° C.

Figure 12B:
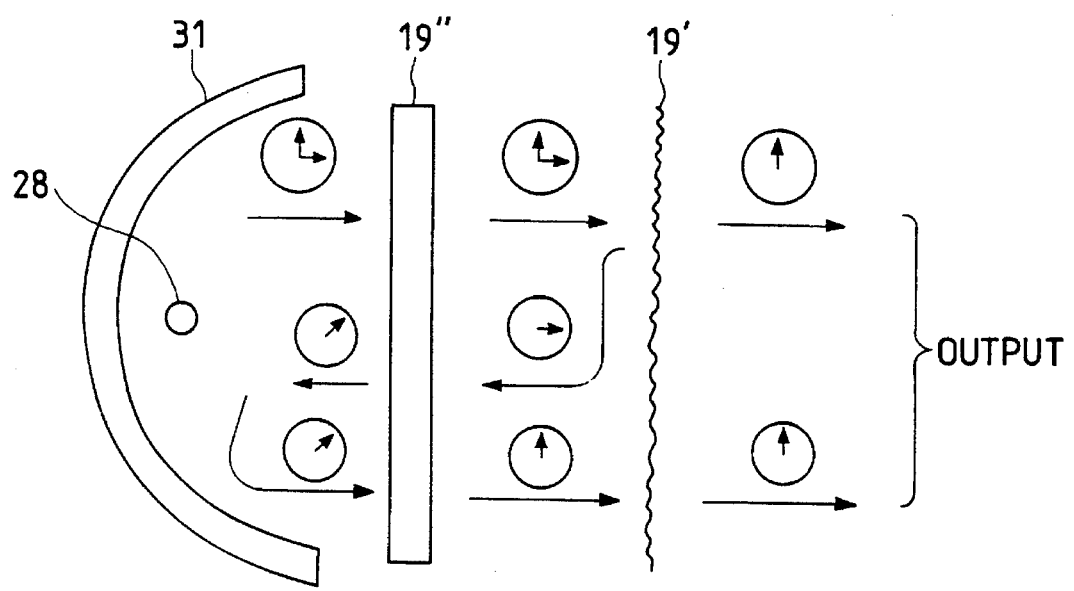

The actions of the diffraction grating 19' and the Faraday element 19" will be described with reference to FIGS. 12b, in which arrows enclosed by circles indicate the directions of polarization of light, respectively. Light rays reflected by the mirror 31 undergo the magnetooptic effect of the Faraday element 19" and diffracted by the diffraction grating 19', and then only longitudinally polarized light rays fall on the transparent plate 19. The laterally polarized light rays are reflected toward the Faraday element 19", turned through an angle of 45° and become longitudinally polarized light rays. Then, the longitudinally polarized light rays travels through the diffraction grating 19'.

As is generally known, the common liquid crystal display panel of the TN system needs polarizing plates on the opposite sides thereof. Accordingly, an energy loss of 50% occurs unavoidably. Since the eighth embodiment shown in FIG. 12a is not provided any polarizing plate on its entrance side, the energy loss is reduced.

Figure 3A:
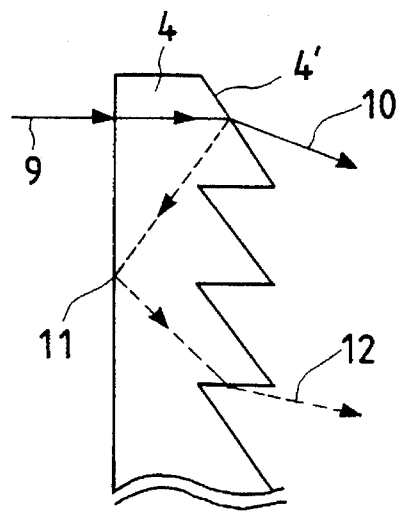
FIGS. 3a and 3b are fragmentary sectional views of a converging Fresnel lens, of assistance in explaining problems in the prior art.
Figure 3B:
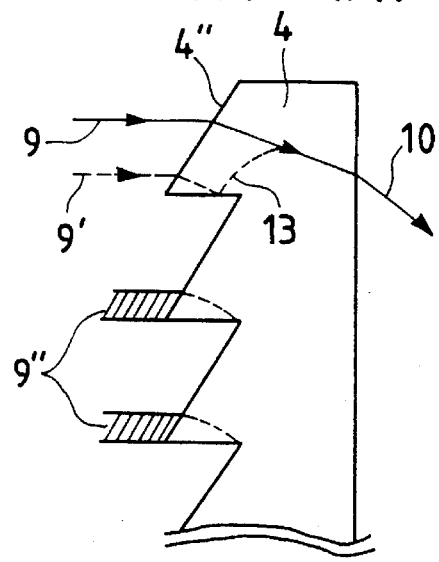
Figure 13:
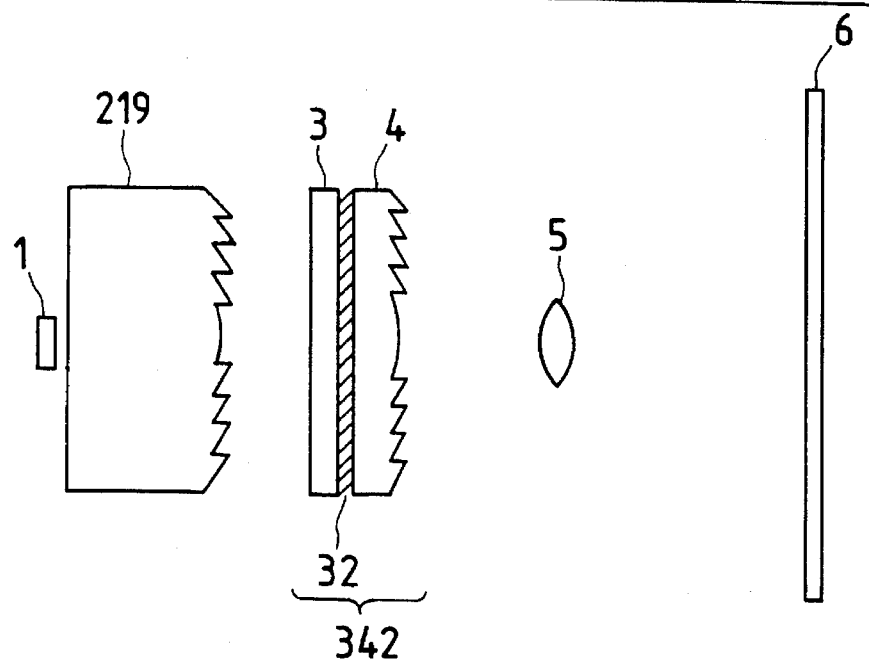
FIG. 13 is a schematic sectional view of a liquid crystal projection display in a ninth embodiment according to the present invention.

Ninth Embodiment:

A liquid crystal projection display in a ninth embodiment according to the present invention shown in FIG. 13 incorporates a ghost interference eliminating means. Shown in FIG. 13 are a light source 1, a liquid lens 219 consisting of a Fresnel collimator lens 2 and a transparent plate 19, a liquid crystal panel, a converging Fresnel lens 4, a projection lens 5 and a screen 6. Indicated at 32 is a transparent adhesive, such as an acrylic adhesive, having a refractive index nearly equal to about 1.5, which is the refractive index of an acrylic resin forming the Fresnel lens 4. Accordingly, light rays will not be reflected by the interface between the adhesive 32 and the Fresnel lens 4, so that the undesirable ghost light rays, which has been previously described with reference to FIG. 3b, will not be produced. The constituent feature of the ninth embodiment is in joining the Fresnel lens 4 to the exit surface of the liquid crystal panel 3 with the adhesive having a refractive index in the range of 1.4 to 1.6.

Figure 14:
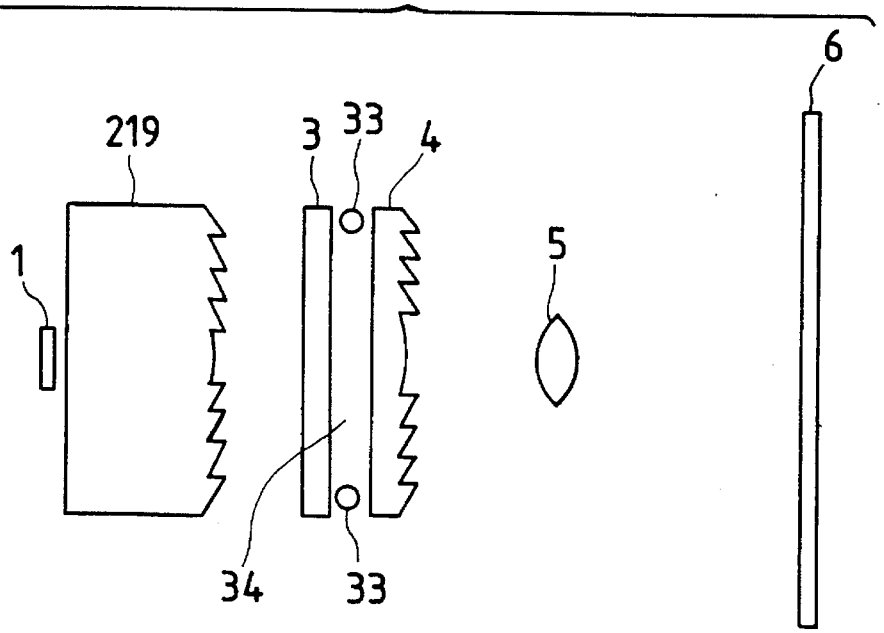
FIG. 14 is a schematic sectional view of a liquid crystal projection display in a tenth embodiment according to the present invention.

Tenth Embodiment:

FIG. 14 shows a liquid crystal projection display in a tenth embodiment according to the present invention, which employs a liquid 34 having a refractive index in the range of 1.4 to 1.6, such as silicone oil, ethylene glycol or glycerol. The liquid 34 is sealed in a space formed between a liquid crystal panel 3 and a Fresnel lens 4 and sealed with a sealing member 33. The liquid eliminates ghost interference and cools the liquid crystal panel 3. In a modification, the liquid 34 may be sealed in a space formed on the entrance side of the liquid crystal panel 3. The constituent feature of the tenth embodiment is sealing the liquid having a refractive index in the range of 1.4 to 1.6 in the space formed between the liquid crystal panel 3 and the Fresnel lens 4 disposed behind the liquid crystal panel 3 with respect to the direction of travel of light rays.

Figure 15A:
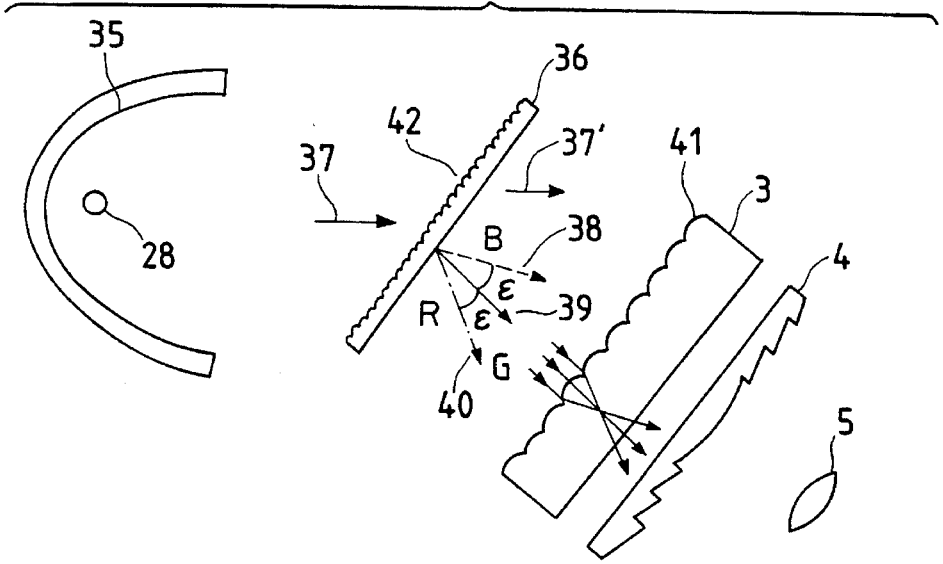
FIGS. 15a, 15b and 15c are views of assistance in explaining a liquid crystal projection display in an eleventh embodiment according to the present invention.
Figure 15B:
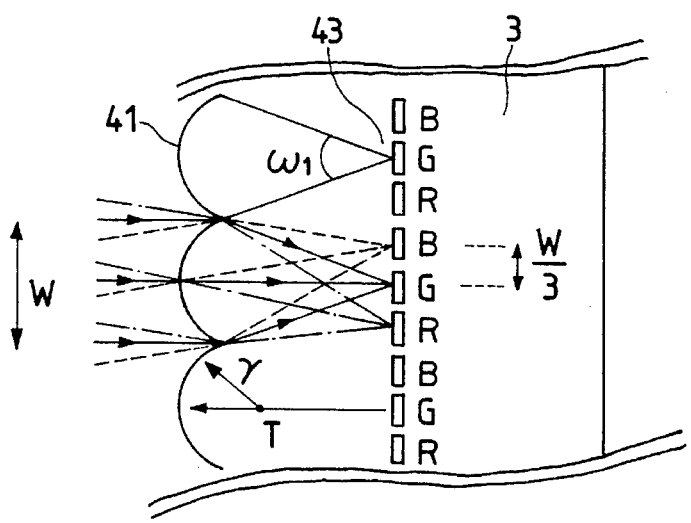
Figure 15C:
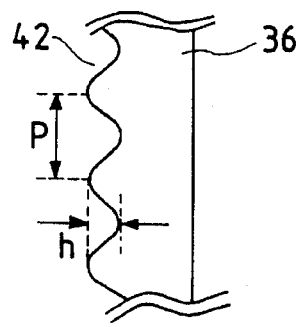

Eleventh Embodiment:

A liquid crystal projection display in an eleventh embodiment according to the present invention is shown in FIG. 15a, in which there are shown a point light source 28, a paraboloidal mirror 35, a diffraction plate 36 formed of a transparent plastic, a liquid crystal panel 3, lenticular lenses 41 forming the entrance surface of the liquid crystal panel 3, a Fresnel lens 4, and a projection lens 5. Light rays reflected by the paraboloidal mirror 35 are substantially parallel light rays. As shown in FIG. 15c, lenticular lenses 42 form the entrance surface of the diffraction plate 36. The lenticular lenses 42 are arranged at a pitch P slightly greater than the wavelength of the light rays and the height h of the lenticular lenses 42 is substantially equal to the wavelength of the light rays. The height h of the lenticular lenses 42 is determined so as to meet well known conditions for minimizing diffracted light 37' (FIG. 15a) of zero-th order. As is generally known, the conditions for minimizing diffracted light of zero-th order is substantially the same as those for maximizing diffracted light of first order. Diffracted light of first order travels in the direction of the arrow 39 (FIG. 15a). In FIG. 15a, the arrows 38, 39 and 40 indicate the directions of travel of blue light rays B, green light rays G and red light rays R, respectively. As shown in FIG. 15b, these light rays R, G and B are refracted by the lenticular lenses 41 forming the entrance surface of the liquid crystal panel 3. In FIG. 15b, dotted lines represent blue light rays B, continuous lines represent green light rays G and alternate long and short dash lines represent red light rays R. The lenticular lenses 41 have the shape of an elliptic cylinder having an eccentricity approximately equal to the reciprocal of the refractive index of the material forming the lenticular lenses 41. Pixels are arranged at the foci of the lenticular lenses 41.

When conditions represented by the following expressions are met, the red light rays R, the green light rays G and the blue light rays B fall on the red pixels R, green pixels G and blue pixels B of the liquid crystal panel 3.

$$r \simeq \frac{n-1}{n} T, \omega_1 = \frac{W}{T} \quad (6)$$

$$\frac{W}{3} \simeq \frac{T_\epsilon}{n}, \omega_1 > \omega \quad (7)$$

$$\epsilon \simeq \frac{620 \text{ nm} - 520 \text{ nm}}{\sqrt{p^2 - \lambda^2}} \text{ rad} \quad (8)$$

where n is the refractive index of the material forming the lenticular lenses 41, T is the focal length of the lenticular lenses 41, r is the radius of curvature of the lenticular lenses 41, W is the pitch of the lenticular lenses 41, which is equal to the pitch of the pixel trios, $\omega_1$ is the convergence angle of light rays converged by the lenticular lenses 41 and $\omega$ is the divergence angle the collimated of light. If T=1.1 mm, n=1.5 and $\epsilon$=0.14, from the expressions (6) and (7), r≈0.37 mm, W≈0.3 mm and $\omega_1$≈0.27 rad.

If P=900 nm and λ=570 nm, from the expression (8), $\epsilon$≈0.14 rad.

The loss of light energy at the liquid crystal panel 3 can be remarkably reduced. If the divergence angle ω of the collimated light (FIG. 1a) is 0.09 rad, the light transmissivity of the liquid crystal panel 3 is multiplied by about three times.

Figure 16:
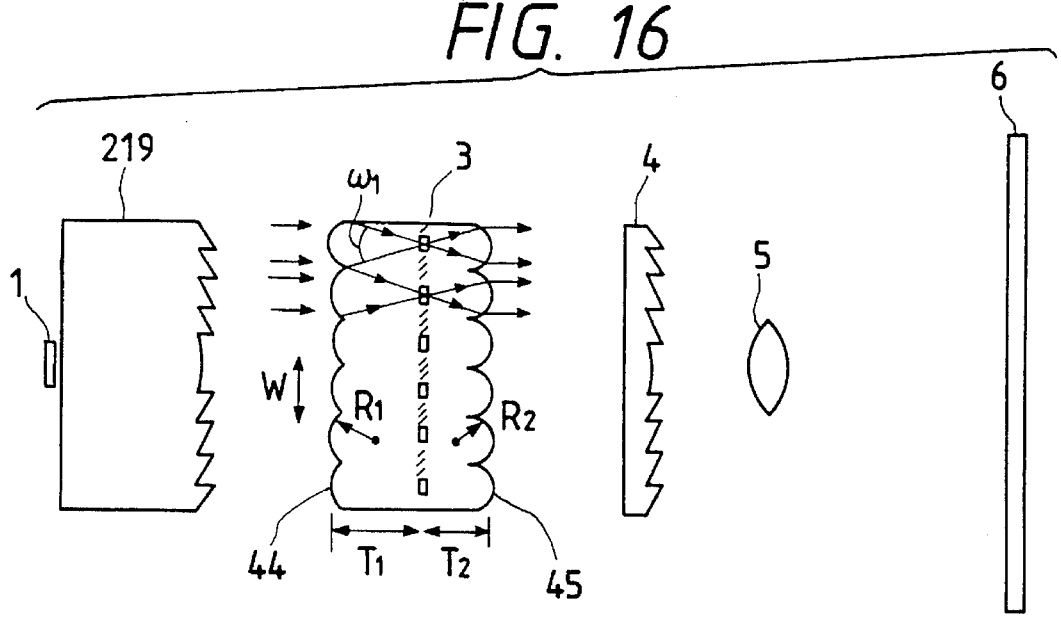
FIG. 16 is a schematic sectional view of a liquid crystal projection display in a twelfth embodiment according to the present invention.

Twelfth Embodiment:

A liquid crystal projection display in a twelfth embodiment according to the present invention is shown in FIG. 16, in which there are shown a light source 1, a liquid lens 219 consisting of a Fresnel lens 2 and a transparent plate 19, a Fresnel lens 4, a projection lens 5, a screen 6, lenticular lenses 44 located at the entrance side of the liquid crystal panel 3, and lenticular lenses 45 located at the exit side of the liquid crystal panel 3. The distance $T_2$ between the lenticular lenses 45 and the pixel plane is made at least 0.7 times smaller than the distance $T_1$ between the lenticular lenses 44 and the pixel plane. The light transmissivity of the liquid crystal panel 3 can be improved when conditions represented by the following expressions are met.

$$R_1 = \frac{n-1}{n} T_1, R_2 = \frac{n-1}{n} T_2, \quad (9)$$

$$\omega_1 \simeq \frac{W}{T_1} > \omega, \ T_2/T_1 = 0 \sim 0.7$$

For example, W=0.3 mm, n=1.5, $T_1$ =1.1 mm, $\omega_1$ =0.27 rad, $R_1$ =0.37 mm and $T_2$ =0.7 mm, $R_2$ =0.23.

The lenticular lenses 45 located at the exit side of the liquid crystal panel 3 weaken the divergence of light rays caused by the lenticular lenses 44 located at the entrance side of the liquid crystal panel 3.

Thirteenth Embodiment:

A liquid crystal projection display in a thirteenth embodiment according to the present invention incorporates a means for reducing the effect of ghost interference attributable to the Fresnel lens 4 in the eleventh and twelfth embodiment.

Figure 17A:
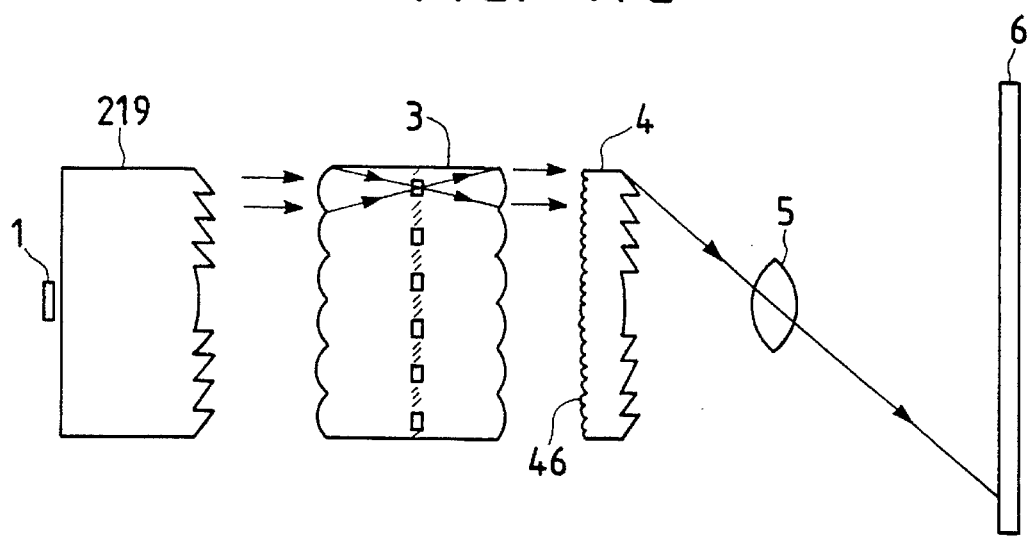
FIGS. 17a, 17b, 17c and 17d are views of assistance in explaining a liquid crystal projection display in a thirteenth embodiment according to the present invention.
Figure 17B:
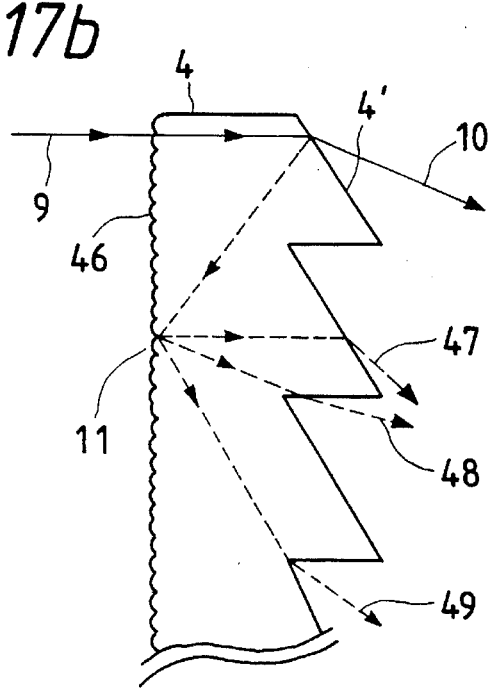

As shown in FIG. 17a, lenticular lenses are formed on the entrance surface of a Fresnel lens 4. Referring to FIG. 17b, incident light rays 9 are split into normal light rays 10 and ghost light rays by the Fresnel lens 4. The ghost light rays are scattered by the lenticular lenses 46 and leave the Fresnel lens 4 in directions 47, 48 and 49 as indicated by dotted lines, so that the effect of ghost interference of the ghost light rays is reduced, which will be understood from the comparison of the mode of travel of ghost light rays described with reference to FIG. 3a with the mode of travel of ghost light rays in this embodiment. As shown in FIG. 17c, the scattering angle of ghost light rays within the lenticular lenses 46 is twice the curving angle a, namely, an angle formed between tangents to each lenticular lens 46 at the opposite roots of the same (FIG. 17c). In FIG. 17c, indicated at 50 and 51 are incident ghost light rays and at 52 and 53 are scattered ghost light rays. The scattering angle 2a is multiplied by the refractive index n according to the Snell's law when the scattered light rays leave the Fresnel lens 4. The scattering angle 2an is 2n/(n-1) times the diverging angle (n - 1) a of light rays refracted by the refractive power of the lenticular lens 46. If n=1.5, 2n/(n - 1)=6. Thus, the scattering angle of ghost light rays scattered by reflection is as large as about six times the diverging angle of light rays caused to diverge by the refractive power of the lenticular lenses by scattering the light rays at a small diverging angle by refraction. Thus, ghost interference can be effectively reduced. The angle a must be 0.2 rad or below not to make the scattering angle of scattered light rays caused to scatter by refraction excessively large and must be 0.04 rad or above to make the scattering angle of light rays scattered by reflection sufficiently large (0.04≦a≦0.2).

Figure 17D:
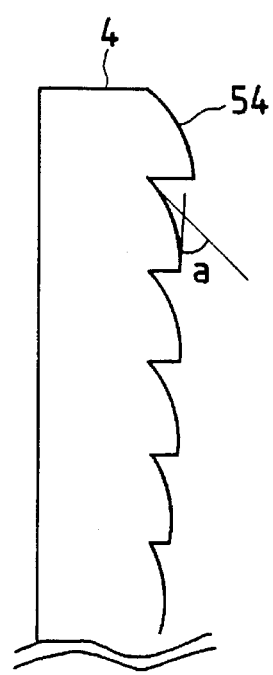
Figure 17C:
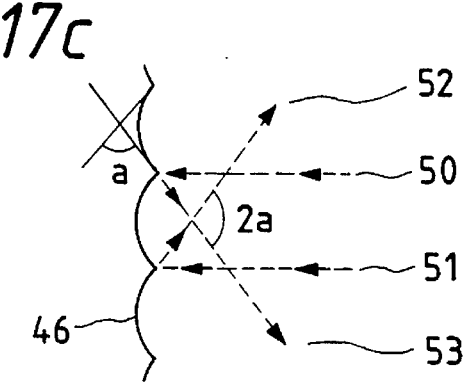

FIG. 17d shows a Fresnel lens 4 employed in a modification of the thirteenth embodiment. The exit surface 54 of this Fresnel lens 4 has the function of lenticular lenses. The exit surface 54 serves as Fresnel lenticular lenses, in other words, lenticulated Fresnel lenses for reducing ghost interference. As mentioned above, the curving angle for the lenticulation a is in the range of 0.04 to 0.2.

Figure 18:
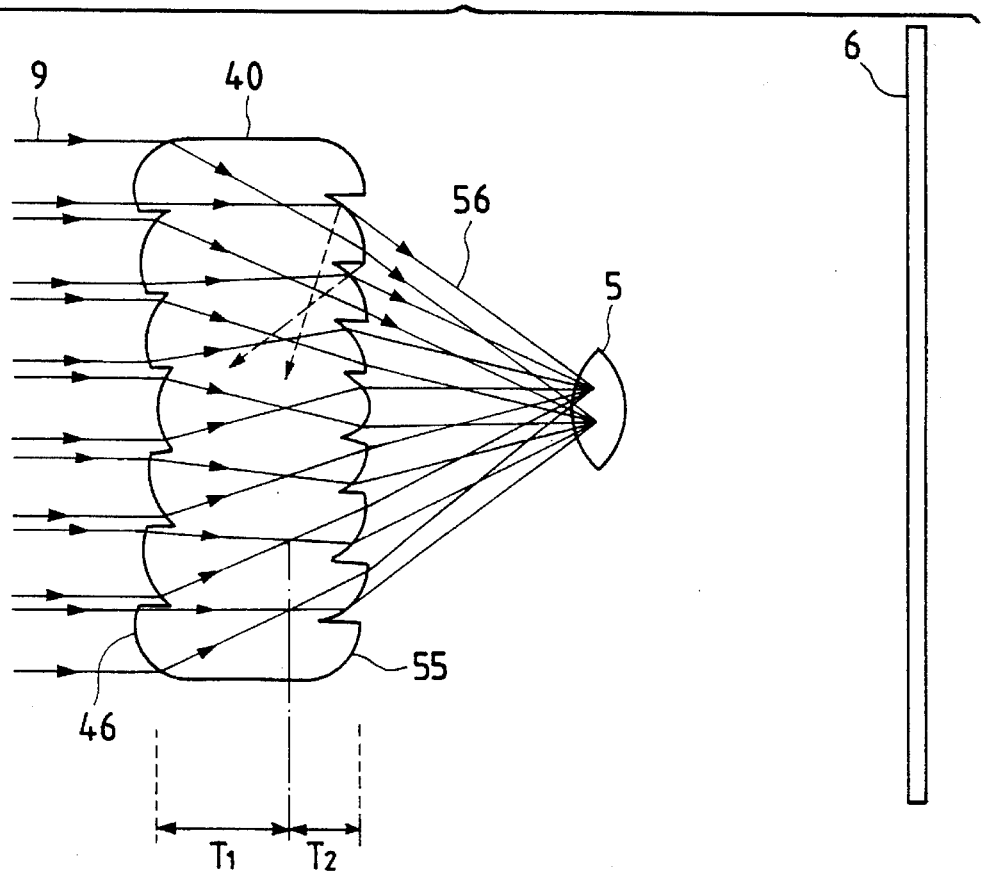
FIG. 18 is a diagrammatic view of a modification of the thirteenth embodiment.

FIG. 18 shows a double-sided composite Fresnel lens 40 employed in another modification of the thirteenth embodiment. In FIG. 18, there are shown also a projection lens 5, a screen 6, light rays 9 transmitted through a liquid crystal panel, a Fresnel entrance surface 46, a Fresnel exit surface 55 and outgoing light rays 56. The double-sided composite Fresnel lens 40 reduces ghost interference and reduces the diverging angle of refracted light rays.

Figure 19A:
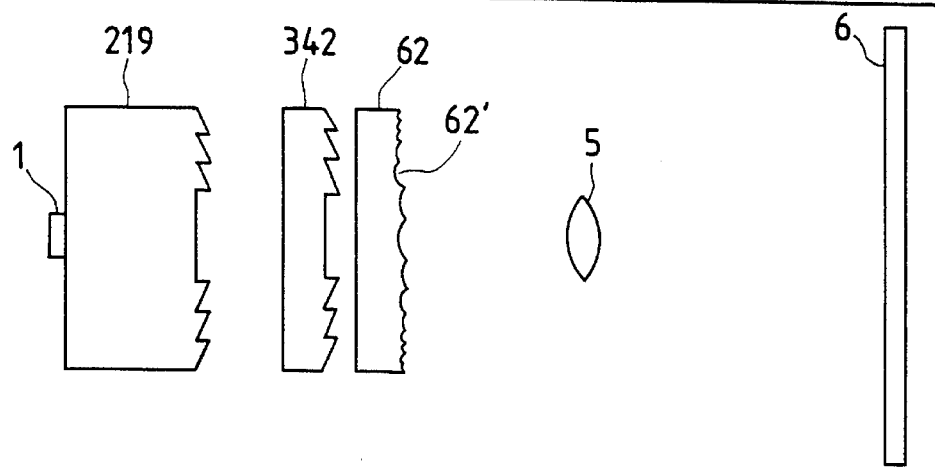
FIGS. 19a, 19b and 19c are views of assistance in explaining a liquid crystal projection display in a fourteenth embodiment according to the present invention.
Figure 19B:
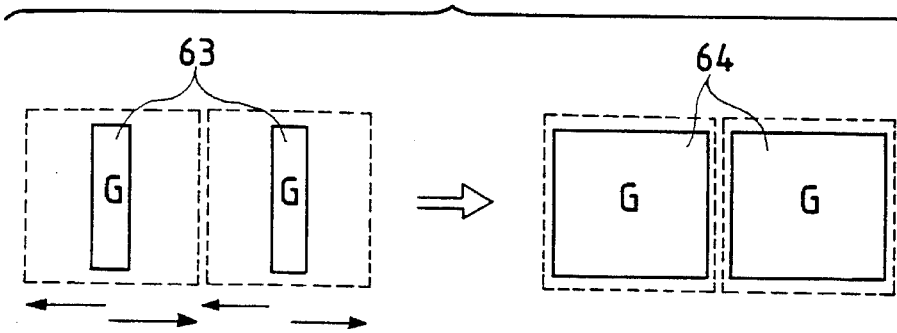

Fourteenth Embodiment:

FIG. 19a shows a liquid crystal projection display in a fourteenth embodiment according to the present invention. The fourteenth embodiment incorporates a means for effectively reducing moiré interference and is featured by a lenticular plate 62 provided with lenticular lenses 62' on its exit surface. In FIG. 19a, there are shown a light source 1, a liquid lens 219 consisting of a Fresnel lens and a liquid, etc., as already mentioned for example in FIG. 7a, a composite liquid crystal panel 342 consisting of a liquid crystal panel, a Fresnel lens, and a transparent adhesive adhesively jointing together the liquid crystal panel and the Fresnel lens as already mentioned in FIG. 13, a projection lens 5, and a screen 6. In FIG. 19b, indicated at 63 are green pixels having a width smaller than the pitch of the pixels, and at 64 are the images of the green pixels formed on the screen 6, having a width equal to the pitch of the pixels. Thus, the width of the pixels is enlarged on the screen 6 to the value corresponding to the pitch of the pixels on the principle as illustrated in FIG. 19c.

Figure 19C:
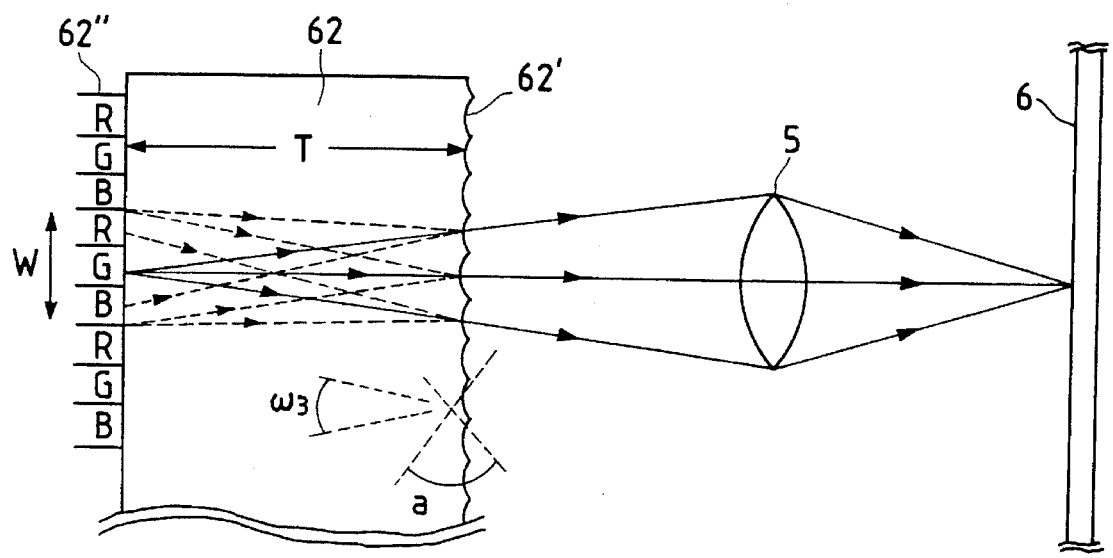

In FIG. 19c, indicated at 62'' is a pixel arrangement equivalent to the arrangement of the pixels on the liquid crystal panel 3. In FIG. 19c lines are formed by tracking light rays in the reverse direction and show the width of an area on the liquid crystal panel 3 corresponding to the width of a dot on the screen 6. The width of a dot on the screen 6 is equal to the pitch W of the pixel trios when conditions represented by the following expression are met.
where T is the distance between the lenticular lenses 62' and the pixel plane of the liquid $$W = \omega_3 \cdot T, \quad \omega_3 = \frac{n-1}{n} a \qquad (10)$$

crystal panel 3, $\omega_3$ is the diverging angle within the lenticular lenses 62', a is the curving angle of the lenticular lenses 62' and n is the refractive index of the lenticular lenses 62'.

When T=3 mm, W=0.3 mm and $\omega_3$=0.1 rad, the width of the pixels on the liquid crystal panel 3 is 0.3 mm. Accordingly, on the basis of the Snell's law, the curving angle a of the lenticular lenses 62' is 0.3 rad if the refractive index n=1.5.

Figure 20:
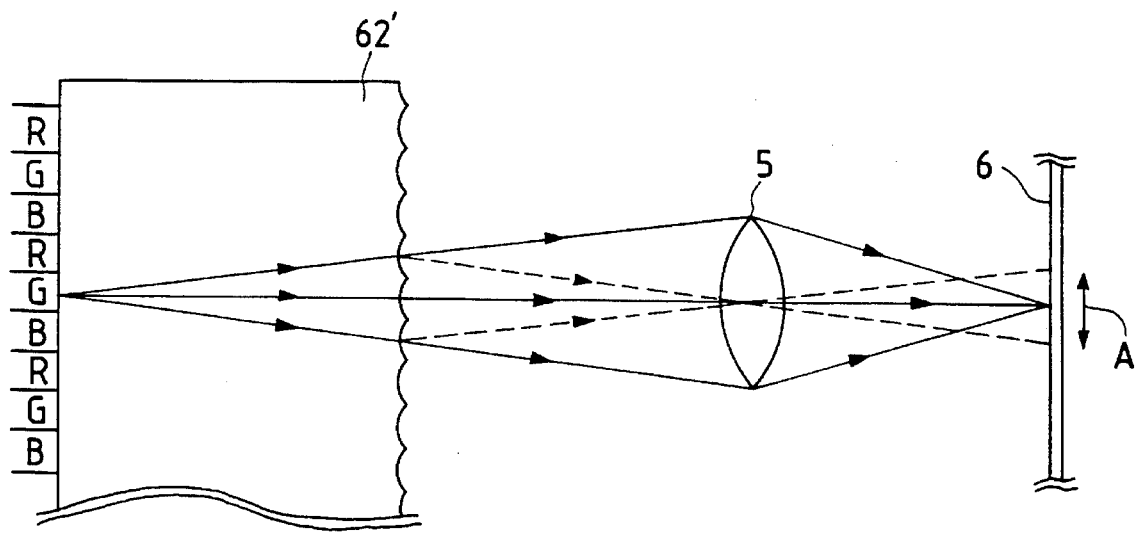
FIG. 20 is a view of assistance in explaining a liquid crystal display in a fourteenth embodiment according to the present invention.

FIG. 20 shows lines formed by tracking light rays traveling in the normal direction from a point on the liquid crystal panel 3 to the screen 6. In FIG. 20, A is the width of a pixel image on the screen 6. According to the reciprocity theorem (interchangeability of an object point and an image point) as applied to a common focusing optical system, A is approximately equal to the pitch of pixel images on the screen 6. Therefore, according to the principle of Fourier analysis, it is possible to make the arrangement of pixels invisible on the liquid crystal panel 3. Quantitatively, the transfer function of the lenticular lenses at the spatial frequency of the pixel trios is approximated by $\sin(\pi\omega_3 T/W) \cdot (W/\pi\omega_3 T)$. Accordingly, the value of the transfer function for the foregoing conditions is zero.

Thus, the fourteenth embodiment is able to eliminate the spatial frequency component of the pitch of the pixel trios to reduce moiré interference attributable to the interference between the minute structure of the screen, which will be described later, and the periodic arrangement of the pixel trios.

Although the lenticular lenses 62' shown in FIG. 20 are of a negative power type (concave lenses), the lenticular lenses 62' may be of a positive power type. The constituent features of the fourteenth embodiment are the lenticular lenses formed on the exit surface of the liquid crystal panel, the diverging angle of the lenticular lenses is in the range of 0.7 W/T to 1.5 W/T rad, where W is the pitch of the arrangement of pixels and T is the distance between the pixels and the lenticular lens 62'. As is obvious from the foregoing expression (10), moiré interference can be remarkably reduced.

Figure 21A:
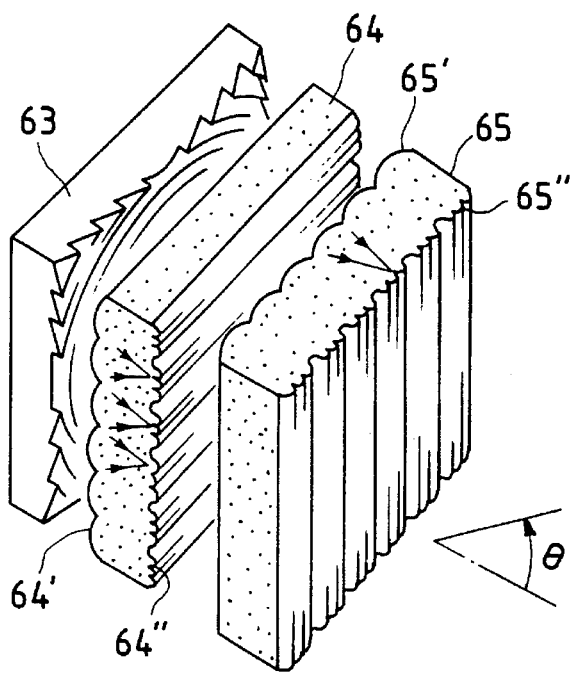
FIGS. 21a, 21b and 21c are a fragmentary perspective view of a liquid crystal projection display in a fifteenth embodiment according to the present invention and graphs of assistance in explaining the fifteenth embodiment, respectively.
Figure 21B:
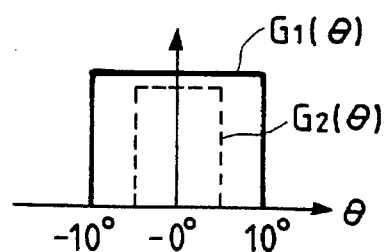
Figure 21C:
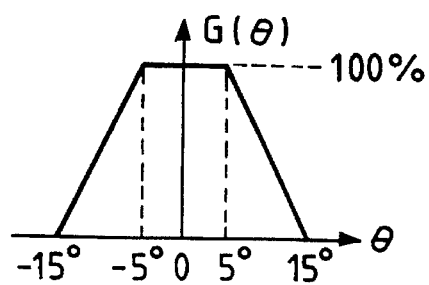

Fifteenth Embodiment:

A liquid crystal projection display in a fifteenth embodiment according to the present invention employs a multilayer screen shown in FIG. 21a, comprising a collimating Fresnel lens 63, a both-sided horizontal lenticular lens plate 64 for vertical divergence and a both-sided vertical lenticular lens plate 65 for horizontal divergence. In FIG. 21b, continuous lines $G_2(\Theta)$ represent the vertical directivity of lenticular lenses 64' on the entrance side and dotted lines $G_2(\Theta)$ represent the vertical directivity of minute lenticular lenses 64'' on the exit side. FIG. 21c shows the overall vertical directivity $G(\Theta)$ of the both-sided horizontal lenticular lens plate 64. When specified conditions, which will be described later, are met, the overall vertical directivity $G(\Theta)$ can be obtained by the convolution of $G_1(\Theta)$ and $G_2(\Theta)$ on the basis of the convolution theorem. As shown in FIG. 21b, a single sided lenticular lens plate has a sharp cut-off directivity and hence is unsuitable for practical application. The both-sided lenticular lens plate 64 having the cascaded lenticular lenses 64' and 64'' has a remote cut-off characteristics, which is suitable for practical application. To obtain the overall vertical directivity $G(\Theta)$ by the convolution of $G_1(\Theta)$ and $G_2(\Theta)$, the pitch of the minute lenticular lenses must be smaller than the width of spread of the image of the pupil of the projection lens. The width of spread of the image of the pupil of the projection lens can be increased by particles dispensed in the lenticular lens plate 64. When the thickness of the lenticular lens plate 64 is 3 mm and the pitch of the lenticular lenses on the entrance side of the lenticular lens plate 64 is 10 0.7 mm, the width of spread is about 0.1 mm. Therefore, the pitch of the minute lenticular lenses 64" is about 0.1 mm. Generally, the pitch of the minute lenticular lenses 64" on the exit side is about ½ of that of the lenticular lenses 64' on the entrance side.

Sixteenth Embodiment:

FIG. 22*a* shows a liquid crystal projection display in a sixteenth embodiment according to the present invention and FIG. 22*b* shows a modification of the sixteenth embodiment. The sixteenth embodiment comprises the foregoing optical system of the present invention and mirrors for deflecting the light passages of the optical system. As shown in FIG. 22*a*, the liquid crystal projection display comprises a light source 1, a liquid lens 219 consisting of a Fresnel lens 2 and a liquid 19, a composite liquid crystal panel 342 consisting of a liquid crystal panel 3, a Fresnel lens 4, and an adhesive 32 adhesively joining together the liquid crystal panel 3 and the Fresnel lens 4, a projection lens 5, a screen 6 and deflecting mirrors represented by hatched parts. The liquid crystal projection display provided with the deflecting mirrors can be formed in a compact construction. The suitable diagonal length of the screen 6 is in the range of 35 in. to 70 in.

Figure 23:
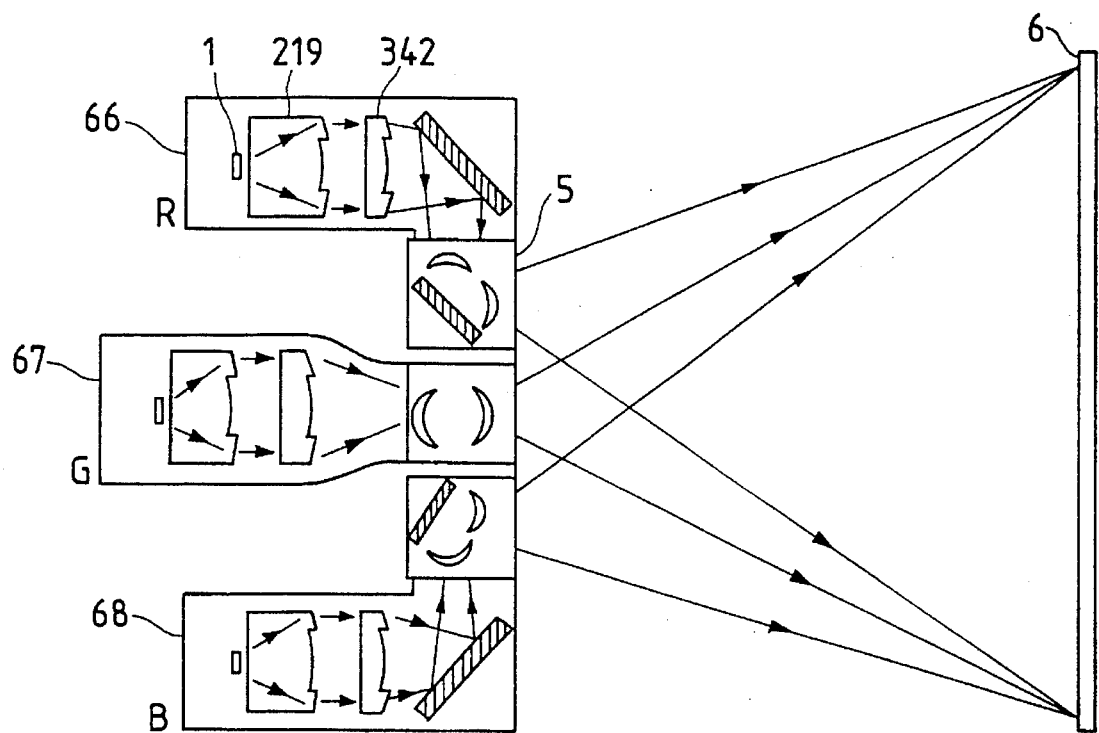
FIG. 23 is a typical sectional view of a liquid crystal projection display in a seventeenth embodiment according to the present invention.

Seventeenth Embodiment:

FIG. 23 shows a liquid crystal projection display in a seventeenth embodiment according to the present invention. This liquid crystal projection display is provided with three projectors 66, 67 and 68, which are operated in parallel. This configuration is suitable for liquid crystal projection displays having a screen of 100 in. or above in diagonal length.

Figure 24:
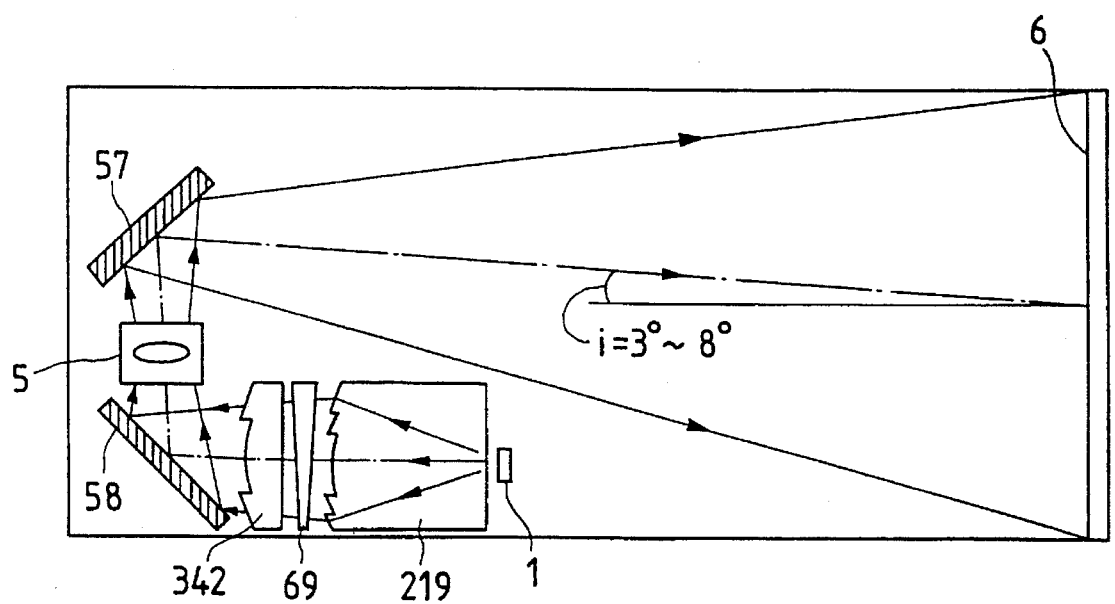
FIG. 24 is a typical sectional view of a liquid crystal projection display in an eighteenth embodiment according to the present invention.

Eighteenth Embodiment:

FIG. 24 shows a liquid crystal projection display in an eighteenth embodiment according to the present invention. The eighteenth embodiment is a liquid crystal projection display of a unit display type provided with a screen of about 50 in. in diagonal length. The liquid crystal projection display is provided with mirrors 57 and 58 and a prism 69 to incline light rays transmitted through the liquid crystal panel at an angle in the range of about 3° to about 8° so that the light rays coincide with the optical axis of the liquid crystal panel. As is generally known, the optical axis of a TN liquid crystal panel optimal for tone reproduction is inclined at an angle in the range of about 3° to about 8° to the normal to the liquid crystal panel. Inclination of the projected light rays and the use of the mirrors 57 and 58 enable the liquid crystal projection display to be formed in a compact construction.

A huge multiscreen display can be formed by arranging a plurality of display units like the display unit of the eighteenth embodiment in a matrix.

Figure 25A:
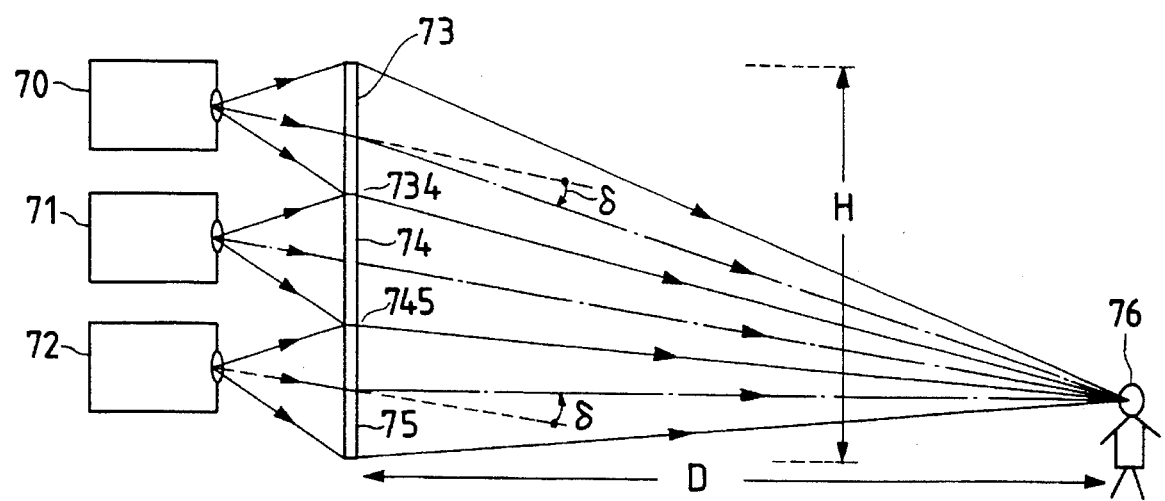
FIGS. 25a and 25b are diagrammatic views of assistance in explaining a liquid crystal projection display in a nineteenth embodiment according to the present invention.

Nineteenth Embodiment:

FIG. 25*a* shows a multiscreen liquid crystal projection display in a nineteenth embodiment according to the present invention. The multiscreen liquid crystal projection display is provided with three projectors 70, 71 and 72, and screens 73, 74 and 75. In FIG. 25*a*, indicated at 76 is a principal viewing position. When principal light rays are emitted from the screens 73, 74 and 75 toward the principal viewing position 76 as shown in FIG. 25*a*, the entire areas of the screens 73, 74 and 75 can be clearly seen from the principal viewing position. When principal light rays are thus emitted, no detrimental brightness step can be seen on the boundaries between the screens 73 and 74 and between the screens 74 and 75 even if the screens 73, 74 and 75 are viewed from a position other than the principal viewing position 76.

Figure 25B:
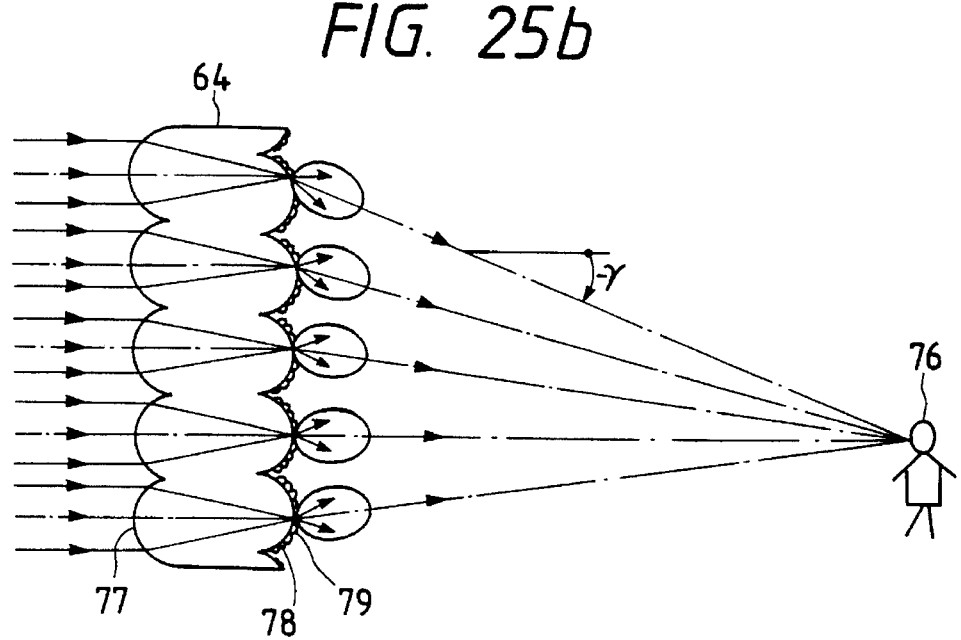

The nineteenth embodiment employs, as a means for directing principal light rays toward the principal viewing position 76, the both-sided horizontal lenticular lens plate 64 of the multilayer screen of FIG. 21*a*. FIG. 25*b* is an enlarged fragmentary sectional view of the both-sided horizontal lenticular lens plate 64. The both-sided horizontal lenticular lens plate 64 has entrance lenticular lenses 77 for vertical divergence and an exit composite lenticular lenses each consisting of a converging lenticular lens 78 for general vertical convergence and minute lenticular lenses 79 for local, vertical divergence formed on the surface of each converging lenticular lens 78 for general vertical convergence and minute lenticular lenses 79 for local, vertical divergence formed on the surface of each converging lenticular lens 78. The effect of local, vertical divergence has been previously described with reference to FIGS. 21*b* and 21*c*. The effect of general vertical convergence will be described hereinafter. The converging lenticular lenses 78 are arranged at a pitch smaller than that of the entrance lenticular lenses 77 to converge light rays generally toward the principal viewing position 76 as shown in FIG. 25*b*. The converging lenticular lenses 78 can be designed by using the Fresnel lens designing formula (1).

Figure 26A:
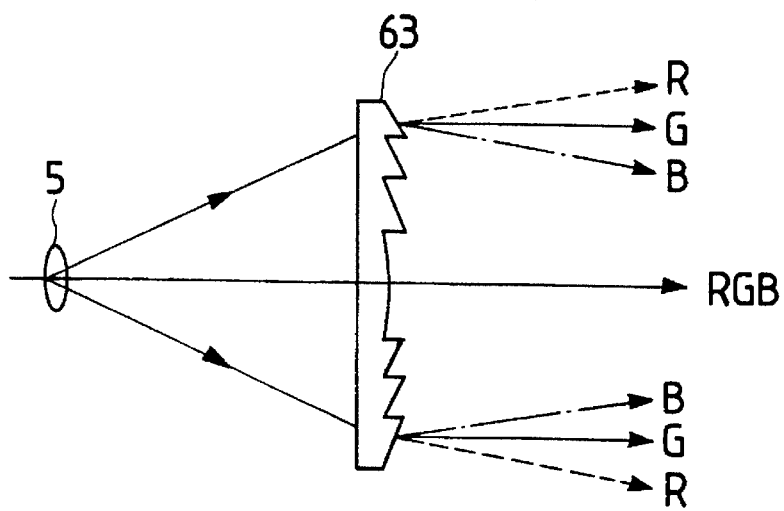
FIGS. 26a and 26b are diagrammatic views of the nineteenth embodiment.
Figure 26B:
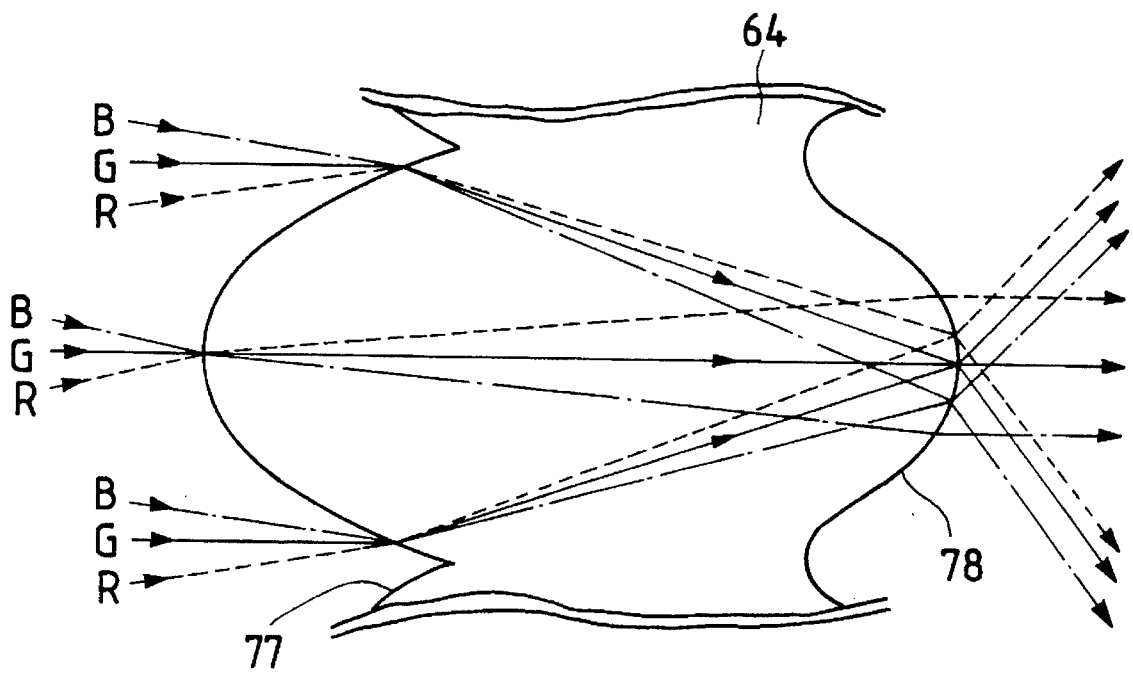

The effect of the nineteenth embodiment will be supplemented with reference to FIGS. 26*a* and 26*b*. In FIG. 26*a*, there are shown a projection lens 5, and a Fresnel lens plate 63 (the Fresnel lens 63 of FIG. 21*a*), i.e., one of the components of the screen. As is generally known, the refractive index of a material, such as an acrylic resin, forming a Fresnel lens plate is relatively small for red light rays R and is relatively large for blue light rays B. Therefore, such a Fresnel lens plate deflects red light rays R, green light rays G and blue light rays B in directions indicated by the arrows R, G and B in FIG. 26*a*, causing chromatic aberration. Accordingly, if the screen is looked at from below the screen, the upper area of the screen looks bluish and the lower area of the screen looks reddish.

The horizontal lenticular lens plate 64 of FIG. 25*b* is shown in an enlarged, fragmentary sectional view in FIG. 26*b*, in which the minute lenticular lenses 79 for local, vertical divergence are omitted for simplicity. Although red light rays R, green light rays G and blue light rays B transmitted through the Fresnel lens plate 63 cross obliquely with each other and travel in difference directions, respectively, in the both-sided horizontal lenticular lens plate 64, the converging lenticular lenses 78 make the red light rays R, the green light rays G and the blue light rays B travel in parallel to each other, so that the upper and lower areas of the screen will not look unusual in the respect of colors, even if the screen is looked at from below the same and hence images are displayed on the screen in natural colors.

As is obvious from the foregoing description, the constituent features of the screen employed in the fifteenth, sixteenth and seventeenth embodiments (FIGS. 21*a*, 22*a* and 23) are as follows.

The screen comprises the collimating Fresnel lens plate, the both-sided horizontal lenticular lens plate for vertical divergence, and a both-sided vertical lenticular lens plate for horizontal divergence, the both-sided horizontal lenticular lens plate is provided with the horizontal lenticular lenses for vertical divergence on its entrance surface, and composite horizontal lenticular lenses, each consisting of the converging lenticular lens for vertical convergence and minute lenticular lenses for vertical divergence formed on the surface of the lenticular lens, on its exit surface, the pitch of the converging lenticular lenses for vertical convergence formed on the exit surface of the both-sided horizontal lenticular lens plate is smaller than that of the horizontal lenticular lenses for vertical divergence formed on the entrance surface of the same, and the pitch of the minute lenticular lenses is about 1/7 or below of the pitch of the horizontal lenticular lenses.

Figure 27A:
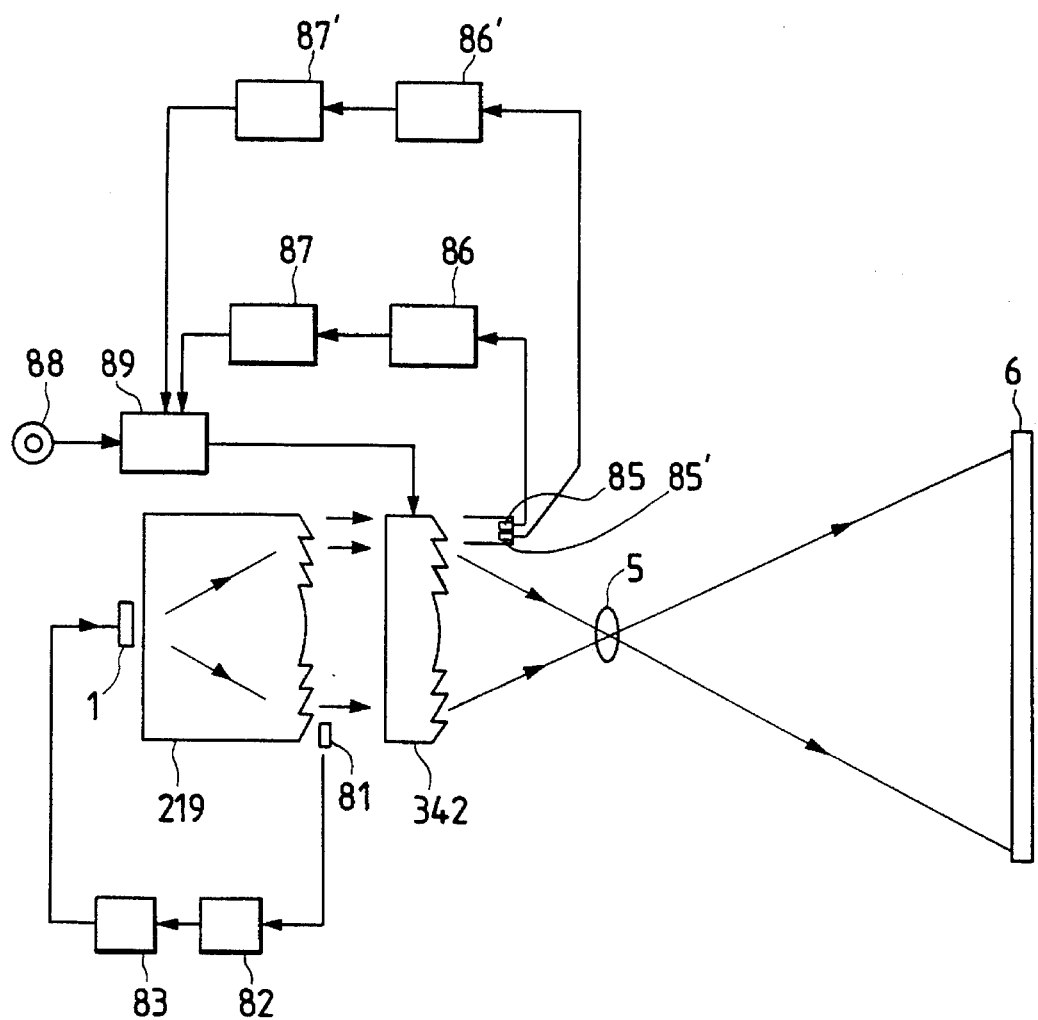
FIGS. 27a and 27b are block diagrams of a liquid crystal projection display in a twentieth embodiment according to the present invention.

Twentieth Embodiment:

A liquid crystal projection display in a twentieth embodiment according to the present invention shown in FIG. 27a incorporates a means effective particularly for reducing the brightness difference between the component projectors of a multiscreen liquid crystal projection display. This means is also effective for cancelling the temperature dependence of the gradation control characteristics of a stand-alone liquid crystal panel.

Shown in FIG. 27a are a light source 1, a liquid lens 219, a composite liquid crystal panel 342, a projection lens 5, a screen 6, a photodetector 81, such as a photodiode, detecting circuits 82, 86 and 86', such as detecting resistors, control circuits 83, 87 and 87', an image signal input terminal 88 and an image signal processing circuit 89.

Figure 28:
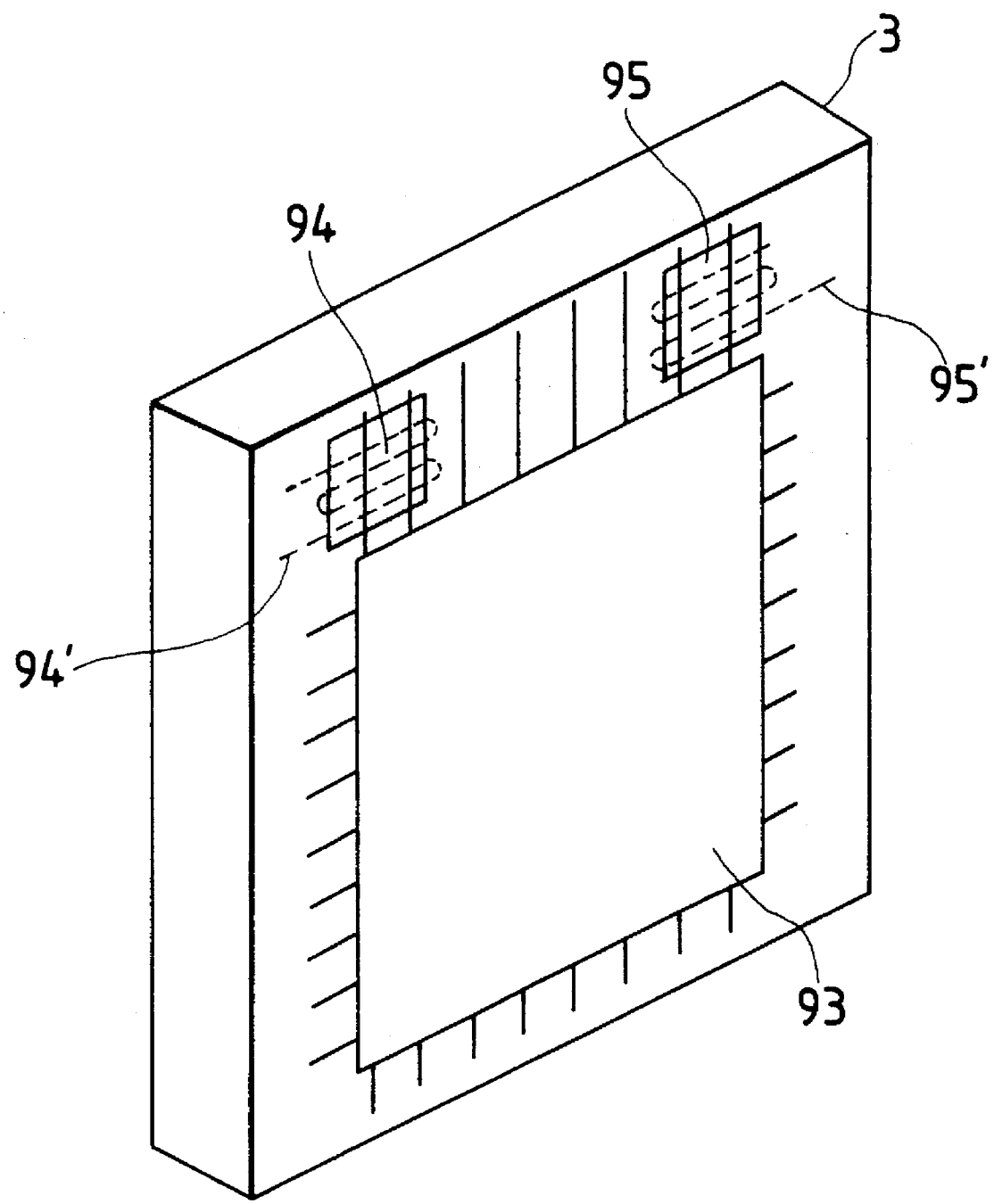
FIG. 28 is a perspective view of assistance in explaining the twentieth embodiment.

The photodetector 81 converts light into a current, the detecting circuit converts the current produced by the photodetector 81 into a corresponding voltage, and the control circuit 83 controls the light source 1 in a feedback control mode. Also shown in FIG. 27a are a black level light detector 85 for detecting an output light strength corresponding to a black level signal and a white level light detector 85' for detecting an output light strength corresponding to a white level signal. The black level light detector 85 and the white level light detector 85' are disposed opposite to the exit surface of the composite liquid crystal panel 342. In FIG. 28, indicated at 92 is an image forming region. Pixels are formed respectively at the intersections of a plurality of row lines and column lines. The black level light detector 85 (FIG. 27a) detects light emitted from a black level detecting region 94. In FIG. 28, a dotted line 94' represents a row line specially for black level detection. The white level light detector 85' detects light emitted from a white level detecting region 95. In FIG. 28, a dotted line 95' is a row line specially for white level detection. An address voltage is applied to the row lines 94' and 95' during a vertical blanking interval. Therefore, addication of the address voltage to the row lines 94' and 95' will not affect adversely the image forming process which is carried out during a forward vertical scanning period.

Figure 27B:
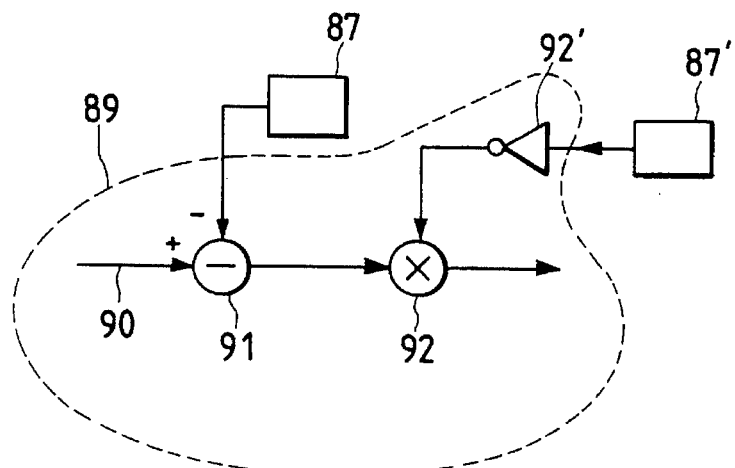

FIG. 27b shows a part of the image signal processing circuit 89. Shown in FIG. 27b are an image signal 90, a subtracter 91 for increasing or decreasing a black level signal, a multiplier 92 for amplifying or attenuating a white level signal, and a polarity inverter 92'.

The black level light detector 85, the detecting circuit 86, the control circuit 87 and the subtracter 91 function for feedback control to stabilize black level light. If the intensity of the black level light is excessively high, the output voltage of the black level light detecting circuit 86 increases, consequently, the output voltage of the control circuit 87 increases and the output voltage of the subtracter 91 decreases. The output signal of the subtracter 91 is transferred through the multiplier 92 to the liquid crystal panel to reduce the intensity of the black level light.

The white level light detector 85', the detecting circuit 86', the control circuit 87', the polarity inverter 92' and the multiplier 92 function for feedback control to stabilize the white level light. If the intensity of the white level light is excessively high, the output voltage of the white level light detecting circuit 86' increases and the output voltage of the control circuit 87' increases accordingly. Consequently, the output voltage of the polarity inverter 92' (FIG. 27b) decreases, the output voltage of the multiplier 92 decreases and, consequently, the intensity of the white level light decreases accordingly.

Thus, the liquid crystal projection display in the twentieth embodiment has excellent stability against the variation of ambient conditions including ambient temperature. The configuration of the twentieth embodiment is applicable to displaying color images, in which the twentieth embodiment operates in the foregoing feedback control mode for each of red color signals, green light signals and blue light signals.

Hereinafter, in FIGS. 29–34, a polar coordinate system is adapted. The origin is located at the center of the light source, and $\Theta$ denotes the vertex angle. Numeral 110 designates the optical axis. FIGS. 29 and 30 are with planar light sources and FIGS. 31–34 are with spherical light sources.

FIG. 29 is to help the understandings of the principle of this invention. In FIG. 29, numeral 1 denotes a planar light source such as already shown in FIG. 4. Numeral 111 denotes a first light converging means such as already shown as numeral 2' in FIG. 4, FIG. 6a or numeral 2 in FIG. 7a or numeral 25 in FIG. 8a or numeral 2 in FIG. 8b. Numeral 112 denotes an auxiliary circle for design aids. The center of the circle is located at the planar light source 1.

Figure 2B:
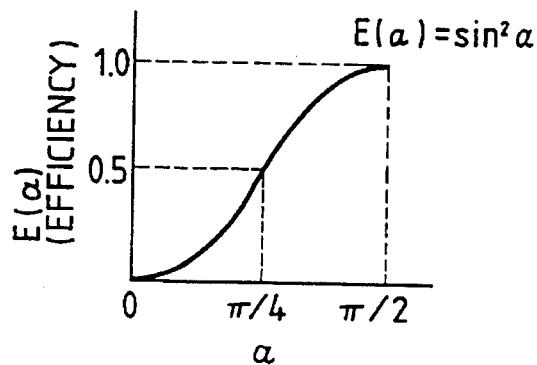

If the light emerging from the light source at an angle $\Theta$ arrives at the exit surface of the first light converging means 111 with the radius height R proportionate to $\sin\Theta$ as shown in FIG. 29, then, the illuminance at the exit surface of 111 would be uniform, namely, the RCI (relative corner illuminance) in FIG. 2a could become unity all over. This is because total light flux emerging from the planar light source and contained within a vertex angle $\Theta$ is proportionate to $\sin^2\Theta$ as already mentioned in FIG. 2b and because, in FIG. 29, the radius height R is proportional to $\sin\Theta$ and hence a disc area with the radius height R is proportionate to $\sin^2\Theta$.

FIG. 30 discloses a variation of the first embodiment and shows how to attain the condition (uniform illumination) above by proper design of a second light converging means of a refractive type. The second light converging means of a refractive type is designated by numeral 113 in FIG. 30. In FIG. 30, real lines with arrows designate light paths. The others are the same as in FIG. 29. As easily understood by the FIG. 30, the converging power (the reciprocal of the focal distance) of the second light converging means of a refractive type 113 is higher at the peripheral and lower at the center; in contrast, the converging power of the first light converging means is higher at the center and lower at the peripheral.

FIG. 31 is to further help an understanding of the principle of this invention. In FIG. 31, numeral 28 denotes a spherical light source such as already shown in FIG. 10 through 12 and FIG. 15a, etc. Numeral 111 denotes the first light converging means such as already shown in FIG. 29. Numeral 114 and 115 denotes an auxiliary polar curve for a design aid.

The length of the arm extending from the origin to the curve is substantially equal to the distance L divided by cos $0.5\Theta$. Therefore, as shown in the figure, an exit height radius R corresponds to L sinΘ divided by cos 0.5Θ. Therefore R is substantially equal to 2L sin 0.5Θ.

If the light emerging from the light source at an angle Θ arrived at the exit surface of the first light converging means 111 with a radius height R proportionate to sin 0.5Θ as mentioned above, then, the illuminance at the exit surface of 111 would be uniform. This is because total light flux emerging from the spherical light source and contained within the vertex angle Θ is proportionate to $\sin^2 0.5\Theta$ which is mathematically equal to the fraction of a stereoscopic angle formed by the vertex angle.

FIG. 32 is a modification of FIG. 31. In FIG. 32, numeral 116 is the same as 115 in FIG. 31 except that Θ is replaced by its supplement as shown in the figure.

FIG. 33 discloses another variation of the first embodiment and shows how to achieve the uniform illumination by proper design of a second light converging means of a reflective type utilizing the design aid curve 116. Numeral 117 designates a second light converging means of a reflective type. Other numerals designate the same components as those in FIG. 32. Numeral 113' designates a second light converging means of a refractive type. The second light converging means of a reflective type 117 is an aspherical reflective mirror and is so constructed as to reflect input light with an vertex angle Θ towards the corresponding radius height R being substantially equal to 2L sin 0.5Θ as already mentioned above. The light paths are shown by real lines with arrows.

FIG. 34 discloses a variation of FIG. 33. Numeral 28' designates a stem part of the spherical light source 28. Numeral 118 designates a mirror means which reflects the diverging light from the light source back to the peripheral proximity of the light source 28, thus improving light efficiency. Numeral 119 designates a light shielding mens which prohibits flare light reflected at the second light converging means of reflective type 117 from going into the second light converging means of refractive type 113', thus improving picture quality. Numeral 120 designates a mirror means which reflects the collimated input light back to the peripheral proximity of the light source 28 as shown by arrows 121, thus improving light efficiency.

FIG. 35 shows a plane view of the mirror means 120. The hatched part 120 is the mirror part and the clear part 122 represents a hollow part. The rectangular shape corresponds to the shape of the LCD panel 3. The LCD panel 3 is located at the output part of the second light converging means 111 as shown in FIG. 34.

In FIG. 34, the first light converging means 111 always belongs to a refractive type. It can be constructed either by a refractive lens or by a Fresnel lens.

The second light converging means of refractive type 113' can be constructed either by a refractive lens or by a Fresnel lens. Further, the second light converging means of reflective type 117' can be constructed by a mirror as already mentioned.

The reasons why mirror means 118 and 120 reflect back the light substantially to the peripheral proximity of the light source instead of the light source itself is because in the case of the light source itself, blue colored light is regretfully turned into red light or infra-red light due to a quantum effect in light source plasma physics, thus causing color purity deteriorations, and in the case of the peripheral proximity, the color of the light is not changed, thus keeping good color purity performance.

The essential key components in FIG. 34 are 111, 113' and 117.

The required conditions are as follows:

(1) The power (the reciprocal of the focal distance) of the first light converging means 111 is higher at its central region than that at its peripheral region, thus converting substantially diverging input light to substantially collimated output light to be applied to the LCD panel, thereby achieving a high-contrast display quality.

(2) The power of the second light converging means (113', 117) is higher at its peripheral region than that at its central region, thus converting diverging input light emerging from the light source 28 to output light inclined toward the first light converging means 111, thereby enhancing a ratio of illuminance at a peripheral region of the first light converging means 111 to that of a central region of the same.

(3) The second light converging means (113', 117) consist of two parts: a close-axis part and a far-axis part.

The close-axis part is formed either by a refractive lens or by a Fresnel lens. The far-axis part is formed by an aspherical mirror. An outer boundary of the output light of the close axis part and an inner boundary of the output light of the far-axis part travel divergently toward the first light converging means 111 and arrive at substantially the same radius height of the first light converging means 111, thereby achieving a uniform illumination across the boundaries.

The present invention is not limited to the foregoing individual embodiments, for example, the present invention may be a combination of some of the foregoing embodiments.

The first to eighth embodiments and variations thereof of the present invention are capable of enhancing the relative corner illuminance without deteriorating the light capturing efficiency or of improving the light capturing efficiency without reducing the relative corner illuminance.

The ninth, tenth and thirteenth embodiments (FIGS. 13, 14 and 16) of the present invention are capable of suppressing ghost interference.

The fourteenth and fifteenth embodiments (FIGS. 17a to 17c and 18) of the present invention are capable of suppressing moire interference.

The sixteenth, seventeenth, eighteenth and nineteenth embodiments (FIGS. 19a to 19c, 20, 21a to 21c and 22a to 22c) are applicable to various liquid crystal projection displays of a stand-alone type, a parallel drive type and a multiscreen type, and to those provided with screens of different sizes.

The twentieth embodiment (FIGS. 27a and 27b) of the present invention has improved stability in tone reproduction.

Similarly, the embodiments depicted and described with reference to FIGS. 29–35 likewise are not limited to the fields described.

Thus the present invention provides liquid crystal projection displays capable of displaying images in high picture quality and of being used in various fields.

We claim:

1. A liquid crystal projection display comprising:

a light source means;

a liquid crystal panel means including a liquid crystal panel;

a projection lens means;

a screen means;

a first optical system disposed on an entrance side of said liquid crystal panel and having a peripheral illuminance enhancing means comprising a first light converging means disposed relatively remote from said light source means, and a second light converging means disposed relatively near to said light source means to enhance a ratio of illuminance of a peripheral region of an entrance surface of said first light converging means to that of a central region of the same;

a liquid lens means, wherein said second light converging means is a transparent plate forming an entrance surface of said liquid lens means, and said first light converging means is a lens means forming an exit surface of said liquid lens.

2. A liquid crystal projection display according to claim 1, wherein said light source means comprises a point light source and an ellipsoidal mirror, said point light source is disposed near one of said foci of said ellipsoidal mirror, and a transparent plate is disposed near a different focus of said ellipsoidal mirror.

3. A liquid crystal projection display comprising:

a light source means;

a liquid crystal panel means including a liquid crystal panel;

a projection lens means;

a screen means;

a first optical system disposed on an entrance side of said liquid crystal panel and having a peripheral illuminance enhancing means comprising a first light converging means disposed relatively remote from said light source means, and a second light converging means disposed relatively near to said light source means to enhance a ratio of illuminance of a peripheral region of an entrance surface of said first light converging means to that of a central region of the same;

wherein a second optical system is disposed on an exit side of said liquid crystal panel, and said second optical system comprises a Fresnel lens means disposed near said liquid crystal panel means, and said Fresnel lens means and said liquid crystal panel means are joined together with a transparent material having a refractive index in a range of 1.4 to 1.6.

4. A liquid crystal projection display comprising: a light source means; a liquid crystal panel means including a liquid crystal panel; a projection lens means; and a screen means;

a lenticular lens means disposed on the exit side of the liquid crystal panel means having lenticular lenses having a diverging angle in the range of 0.7 times to 1.5 times the ratio of the pitch of the pixels of the liquid crystal panel to the distance between the pixel plane and the lenticular lens plane, wherein said screen means comprises: a Fresnel lens plate; a vertical lenticular lens plate for horizontal divergence; and a horizontal lenticular lens plate for vertical divergence provided with horizontal lenticular lenses for vertical divergence on its entrance surface, and a composite lenticular lens means comprising horizontal lenticular lenses for vertical convergence and minute lenticular lenses for vertical divergence formed on the surfaces of the horizontal lenticular lenses; the pitch of the horizontal lenticular lenses for vertical convergence formed on the exit surface is smaller than that of the horizontal lenticular lenses for vertical divergence formed on the entrance surface; and the pitch of the minute lenticular lenses is about ½ or below of the pitch of the horizontal lenticular lenses for vertical divergence formed on the entrance surface.

5. A liquid crystal projection display comprising:

a light source means;

a liquid crystal panel means including a liquid crystal panel;

a projection lens means;

a screen means;

a first optical system disposed on an entrance side of said liquid crystal panel comprising a first light converging means disposed relatively remote from said light source means, and a second light converging means disposed relatively near to said light source means whereby a power of said first light converging means being higher at its central region than that at its peripheral region, thus converting substantially diverging input light to substantially collimated output light to be applied to the LCD panel; and a power of said second light converging means being higher at its peripheral region than that at its central region, thus converting diverging input light emerging from the light source to output light inclined toward the first light converging means, thereby enhancing a ratio of illuminance at a peripheral region of the first light converging means to that of a central region of the same.

6. A liquid crystal projection display according to claim 5, wherein said first light converging means comprises a first Fresnel lens means, said second light converging means comprises a second Fresnel lens means.

7. A liquid crystal projection display according to claim 6, wherein the peripheral region of said second Fresnel lens means is bent toward said light source means so that said second Fresnel lens means is concave toward said light source means.

8. A liquid crystal projection display according to claim 5, further comprising a liquid lens means, wherein said second light converging means is a transparent plate forming the entrance surface of the liquid lens means, and said first light converging means is a lens means forming the exit surface of the liquid lens.

9. A liquid crystal projection display according to claim 5, wherein a second optical system is disposed on the exit side of said liquid crystal panel, and the second optical system comprises a Fresnel lens means disposed near said liquid crystal panel means, and the Fresnel lens means and said liquid crystal panel means are joined together with a transparent material having a refractive index in the range of 1.4 to 1.6.

10. A liquid crystal projection display according to claim 5, wherein said second optical system has a Fresnel lens means disposed near said liquid crystal panel means, and minute elements forming the exit surface of the Fresnel lens have a curving angle in the range of 0.04 to 0.2 rad.

11. A liquid crystal projection display according to claim 5, wherein at least two mirror means are located between said screen means and LCD panel along an optical axis, said optical axis being tilted to the optical axis of said screen means by an angle within a range of 3 degrees to 8 degrees.

12. A liquid crystal projection display according to claim 5, wherein a first lenticular lens means is disposed on the entrance side of said liquid crystal panel means, a second lenticular lens means is disposed on the exit side of said liquid crystal panel means, wherein, the distance between said second lenticular means and liquid crystal pixel plane is made at least 0.7 times smaller than the distance between said first lenticular means and liquid crystal pixel plane.

13. A liquid crystal projection display comprising:

a light source means;

a liquid crystal panel means including a liquid crystal panel;

a projection lens means;

a screen means;

a first optical system disposed on an entrance side of said liquid crystal panel comprising a first light converging means disposed relatively remote from said light source means, and a second light converging means disposed relatively near to said light source means whereby a power of said first light converging means being higher at its central region than that at its peripheral region, thus converting substantially diverging input light to substantially collimated output light to be applied to the LCD panel; and a power of said second light converging means being higher at its peripheral region than that at its central region, thus converting diverging input light emerging from the light source to output light inclined toward the first light converging means, thereby enhancing a ratio of illuminance at a peripheral region of the first light converging means to that of a central region of the same;

wherein said second light converging means consist of two parts comprising a close-axis part and a far-axis part;

the close-axis part being formed by one of a refractive lens and a Fresnel lens, and the far-axis part being formed by a concave mirror; and an outer boundary of the output light of the close axis part and an inner boundary of the output light of the far-axis part traveling divergently toward the first light converging means and arriving at substantially the same radius height of the first light converging means, thereby achieving a uniform illumination across the boundaries.

14. A liquid crystal projection display according to claim 13, further comprising light shielding means being located at an input side of said close-axis part of said second light converging means, thereby prohibiting flare light reflected at said far-axis apart of said second light converging means from going into said close-axis part of said second light converging means.

15. A liquid crystal projection display according to claim 13, further comprising reflecting mirror means located at a side of said light source means in a direction opposite to said close-axis part of said second light converging means, thereby reflecting diverging input light substantially toward said light source.

16. A liquid crystal projection display according to claim 13, further comprising reflecting mirror means being located at an output side of said first light converging means, thereby reflecting an outer part of collimated input light substantially back to said first light converging means, whereby an inner part of said reflecting mirror means being hollow, thus passing an inner part collimated input light toward said liquid crystal panel means.

17. A liquid crystal projection display according to claim 13, wherein a second optical system is disposed on the exit side of said liquid crystal panel, and the second optical system comprises a Fresnel lens means disposed near said liquid crystal panel means, and the Fresnel lens means and said liquid crystal panel means are joined together with a transparent material having a refractive index in the range of 1.4 to 1.6.

18. A liquid crystal projection display according to claim 13, wherein said second optical system has a Fresnel lens means disposed near said liquid crystal panel means, and minute elements forming the exit surface of the Fresnel lens have a curving angle in the range of 0.04 to 0.2 rad.

19. A liquid crystal projection display comprising:

light source means;

liquid crystal panel means;

projection lens means;

light diffraction plate means located along an optical path between said light source means and said liquid crystal panel means; and lenticular lens means located at the input side of said liquid crystal panel means;

wherein said light diffraction plate means diffracting collimated white input light into output light of three directions corresponding to three primary colors, said output light of three directions being equal to diffracted light of a first order, and said diffraction plate means comprising a lenticular structure with a substantially minimized zero-th order light output, said lenticular lens means converging said output light of three directions toward corresponding three primary color picture elements within said liquid crystal panel means respectively, and a separation angle $\epsilon$ between adjacent two directions of said three directions, focal length T of said lenticular lens means, refractive index of said liquid crystal panel means n. and pitch of said lenticular lens means W are substantially structured to conform to $w/3 \div T \, \epsilon/n$.

20. A liquid crystal projection display comprising:

a light source means;

a liquid crystal panel means including a liquid crystal panel;

a projection lens means;

and a screen means;

a white level light detecting means and a photodetector means for detecting an output light strength corresponding to a white level signal provided on the exit surface of said liquid crystal panel;

a detecting circuit means;

an image signal processing circuit means; and a control means for controlling said liquid crystal panel so that an output of said photodetector means is made substantially constant.

\* \* \* \* \*